(12) United States Patent
Tomita et al.

(10) Patent No.: US 7,508,554 B2
(45) Date of Patent: Mar. 24, 2009

(54) IMAGE READER

(75) Inventors: Noriyuki Tomita, Tokyo (JP); Hiroshi Itoh, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1106 days.

(21) Appl. No.: 10/478,216

(22) PCT Filed: Mar. 29, 2002

(86) PCT No.: PCT/JP02/03222

§ 371 (c)(1),
(2), (4) Date: Nov. 28, 2003

(87) PCT Pub. No.: WO03/084210

PCT Pub. Date: Sep. 10, 2003

(65) Prior Publication Data

US 2004/0165226 A1 Aug. 26, 2004

(51) Int. Cl.
*H04N 1/04* (2006.01)
(52) U.S. Cl. .................. 358/483; 358/474; 358/496; 358/498
(58) Field of Classification Search .................. 358/474, 358/484, 483, 482, 514, 512, 513, 497, 496, 358/505, 487, 506, 498; 382/312; 250/280.1, 250/239, 216, 234, 235, 236
See application file for complete search history.

(56) References Cited

U.S. PATENT DOCUMENTS

| | | | | |
|---|---|---|---|---|
| 4,990,764 A * | 2/1991 | Yokochi et al. | .......... | 250/208.1 |
| 5,187,596 A * | 2/1993 | Hwang | ........................ | 358/484 |
| 5,489,992 A | 2/1996 | Endo | | |
| 5,569,390 A | 10/1996 | Endo | | |
| 5,570,204 A | 10/1996 | Kumashiro | | |
| 5,604,606 A * | 2/1997 | Miyashita et al. | ........... | 358/474 |
| 5,783,820 A * | 7/1998 | Takami | ....................... | 250/239 |
| 5,945,664 A * | 8/1999 | Ogura | ...................... | 250/208.1 |
| 6,147,778 A | 11/2000 | Yamada et al. | | |
| 6,455,834 B2 * | 9/2002 | Fujimoto et al. | ......... | 250/208.1 |
| 6,724,503 B1 * | 4/2004 | Sako et al. | .................. | 358/483 |
| 6,967,751 B2 * | 11/2005 | Nagata | ........................ | 358/482 |
| 7,166,827 B2 * | 1/2007 | Sugihara et al. | .......... | 250/208.1 |
| 7,167,284 B2 * | 1/2007 | Sawada | ...................... | 358/483 |
| 7,170,654 B2 * | 1/2007 | Sawada | ...................... | 358/483 |
| 7,206,102 B2 * | 4/2007 | Fukumoto et al. | ......... | 250/208.1 |

FOREIGN PATENT DOCUMENTS

EP  1111901  6/2001
JP  60-248065  12/1985

(Continued)

*Primary Examiner*—Houshang Safaipour
(74) *Attorney, Agent, or Firm*—Oblon, Spivak, McClelland, Maier & Neustadt, P.C.

(57) ABSTRACT

An image reader includes a transparent plate (1) having end portions (1a and 1b) that are chamfered in a direction in which a document is carried thereon. The transparent plate (1) has recess portions (11a and 11b) formed in a lower surface thereof, and a housing (4) is engaged into the recess portions of the transparent plate. The image reader can prevent such a document as a check or banknote from being jammed, can be easily assembled and improve the reliability of the carrying of the document, and enables higher-speed reading.

19 Claims, 14 Drawing Sheets

FOREIGN PATENT DOCUMENTS

| | | |
|---|---|---|
| JP | 1-146672 | 10/1989 |
| JP | 3-9656 | 1/1991 |
| JP | 5-145697 | 6/1993 |
| JP | 8-204901 | 8/1996 |
| JP | 2768866 | 4/1998 |
| JP | 2000-318873 | 11/2000 |
| JP | 2000-327172 | 11/2000 |

* cited by examiner

Background Art

IMAGE READER

FIELD OF THE INVENTION

The present invention relates to an image reader. More particularly, it relates to an improved image reader for reading such an object as a check or banknote.

BACKGROUND OF THE INVENTION

FIG. 1 is a cross-sectional view of a prior art image reader disclosed in Japanese patent publication No.2768866, for example. In the figure, reference numeral 8 denotes a document whose image is being captured, reference numeral 7 denotes a photoelectric conversion unit having a photoelectric transducer 6 aligned in a line, reference numeral 3 denotes a line light source for uniformly applying light to the document 8, reference numeral 2 denotes a plurality of light emitting elements arranged in a line on a substrate for light source, the plurality of light emitting elements consisting of a light emitting diode (LED) chip, for example, reference numeral 14 denotes a transparent plate located under the document 8, the transparent plate consisting of a glass plate, for example, and having a rugged portion used for improving a deflection of the amount of light, reference numeral 5 denotes an optical system (e.g., a rod lens array) located above the photoelectric transducer 6, for converting light and shade information formed on the document 8 into an erect image having the same size as the light and shade information, and reference numeral 4 denotes a housing for housing the photoelectric conversion unit 7, the line light source 3, the transparent plate 14, and the optical system 5, the housing constituting the image reader.

Next, a description will be made as to an operation of the prior art image reader.

The document 8 is carried on the transparent plate 14 and is uniformly irradiated with light emitted out of the light source 3. Light reflected from the document 8 is then formed into an erect image having the same size as the object on the photoelectric transducer unit 6 by the optical system 5 (e.g., a rod lens array) fixedly held in the housing 4, and is then amplified after converted into an electrical signal. Thus a photoelectric-converted output is acquired. The image reader of FIG. 1 can be a facsimile apparatus supporting documents having a size such as A4, in which reading speed is relatively slow and only one direction in which documents are carried is allowed. The prior art image reader assumes that the document whose image is being captured rarely has a bend or broken part.

FIGS. 2(a) to 2(c) are cross-sectional enlarged views each showing a positional relationship between the housing 4 and transparent plate 14 of the prior art image reader. FIG. 2(a) presents a case where the transparent plate 14 is placed at a higher level than the housing 4, FIG. 2(b) presents an ideal case where the transparent plate 14 is placed at the same level as the housing 4, and FIG. 2(c) presents a case where the transparent plate 14 is placed at a lower level than the housing 4. Arrows in FIGS. 2(a) to 2(c) indicate a direction in which the document is carried, and reference numeral 9 denotes a roller for carrying the document 8 while pressing the document 8 towards the transparent plate 14. When there is a difference between the housing 4 and the transparent plate 14 with respect to the direction in which the document is carried, as shown in FIG. 2(a) or 2(c), the head of the document can be jammed and the carrying of the document cannot be carried out well, as shown by reference numerals 8b and 8d. Furthermore, it is actually very difficult to provide an ideal configuration in which the transparent plate 14 is placed at the same level as the housing 4 as shown in FIG. 2(b), and the roller 9 can support only one direction in which the document is carried, the direction being designated by the arrows of FIGS. 2(a) to 2(c). Actually, in the configuration as shown in FIG. 2(a) in which the transparent plate 14 is placed at a higher level than the housing 4, the document is inserted into the image reader such that its head comes into contact with the upper surface of the transparent plate 14, so that the document can be smoothly carried without occurrence of a paper jam of the head of the document.

In recent years, image readers for reading, as the document 8, a check, a vote card for horse racing, or the like have been manufactured based on such a prior art image reader. Such an image reader requires about twice or more speedup as compared with facsimile apparatuses, bidirectional carrying of documents including carrying of documents in a direction in which a wrong inserted document is returned, and a structure that offers stable carrying of documents without occurrence of a paper jam. Image readers for capturing an image of a banknote 80 as the document 8 have recently begun hitting the market, and, when the image of the banknote 80 cannot be captured well because it has a bend or broken part or when a document (including a forged banknote) other than the banknote is inserted, require bidirectional carrying of documents including carrying of documents in a direction in which the inserted banknote 80 is returned.

FIG. 3 is a cross-sectional view showing another prior art image reader. In the figure, reference numerals 10a, 10b, 11a and 11b denote carrying rollers, reference numerals 12a and 12b denote document carrying guides, reference numeral 13 denotes a resin, and reference numeral 15 denotes a document guide.

Because the prior art image reader for capturing the image of the banknote 80 requires at least 5-times or more speedup as compared with facsimile apparatuses, the document guide 15 is disposed on the transparent plate 14, as shown in FIG. 3, instead of the roller 9 used for document carrying, and the image reader is so constructed as to carry the banknote 80 floating apart from the transparent plate 14 along the document carrying guides 12a and 12b arranged before and behind the transparent plate 14 by using the carrying rollers 10a, 10b, 11a and 11b that are arranged before and behind the document guides 12 and 15.

FIG. 4 is a cross-sectional view of another prior art image reader for reading information carried by light passing through a banknote. The image reader of FIG. 4 applies light to the banknote by using a transmission-type light source 17 instead of the light source of FIG. 3, and then reads information carried by the light passing through the banknote. The prior art image reader of FIG. 4 differs from that of FIG. 3 in only the position of the light source, and carries out a reading operation in the same way that the image reader of FIG. 3 does.

Because when there is a difference between the transparent plate 14 and either of the document carrying guides 12a and 12b the banknote 80 that is a document can be blocked or broken by the difference, it is necessary to attach the document carrying guides 12a and 12b to the housing so that they are arranged before and behind the transparent plate 14 by filling gaps between the transparent plate 14 and the document carrying guides 12a and 12b with the resin 13 of normal temperature curing type or the like and with a high degree of accuracy so that there is no difference between the transparent plate 14 and each of the document carrying guides 12a and 12b. It is necessary to take countermeasures to prevent the document carrying guides 12a and 12b from becoming misaligned so that a difference is caused between the transparent plate 14 and either of the document carrying guides 12a and 12b due to a decrease in the adhesive force of the resin 13 according to a heat that occurs in operating environments while the image reader is operating, and to prevent a crack from occurring in the resin 13. It is also necessary to design and assemble the image reader in consideration of the influence of the difference among the thermal expansions of the transparent plate 14, the document carrying guides 12a and 12b, and the housing 4 due to the difference among the temperatures of locations where they are placed, respectively, and it is further necessary to select a material suitable for the resin 13 and to examine a method of curing the material into the resin.

In case where the transparent plate 14 is a glass plate, for example, the transparent plate 14 can have a thickness allowance of about ±0.2 mm. In case where each of the document carrying guides 12a and 12b is a molded object that consists of polycarbonate or the like, each of the document carrying guides 12a and 12b can have a height allowance of about ±0.3 mm. It is therefore necessary to adjust the height of each assembled image reader, to install all the components in the housing in consideration of the parallelism and flatness of each of those components and with difficult manual operations, and to attach the document carrying guides to the housing by filling gaps between the transparent plate and the document carrying guides with the resin 13. Therefore, a problem encountered with such an image reader is that the reliability of the image reader is reduced when a paper jam occurs, and it is necessary to always position a person who performs maintenance when a paper jam occurs near the image reader. Another problem is that when a banknote is carried at a high speed in such an image reader, the image reader cannot always capture the image of the banknote at a high speed because the banknote might go off course due to a wind force.

Old banknotes can have many small cuttings and these small cuttings can become motes and, when the gaps between the transparent plate 14 and the document carrying guides 12a and 12b are not adequately filled with the resin 13 and/or when cracks appear in the resin 13, can enter the housing 14 from the gap between the housing 14 and the transparent plate 14 via the gaps between the transparent plate 14 and the document carrying guides 12a and 12b and/or the cracks in the resin. When motes then adhere to the optical system 5 or the photoelectric transducer 6, a malfunction occurs in the image reader. Therefore, the prior art image reader requires complete overall bonding sealing so that there is no gap between the transparent plate 14 and the housing 4 and no crack appears in the resin 13.

As previously mentioned, a problem with a prior art image reader constructed as mentioned above is that in order to capture an image of such a document as a check or banknote, it is necessary to prevent the document from being jammed in bidirectional carrying of the document, and particularly it is necessary to design and assemble the image reader so that there is no difference between each of the document carrying guides 12a and 12b and the transparent plate 14 when the image reader is used for capturing an image of a banknote.

Another problem is that the reading speed of reading the banknote cannot be raised to solve the problem associated with the carrying of the banknote that the assembly of the image reader is difficult and the reliability of the image reader is low, and it is difficult to completely seal the housing 4 with the transparent plate 14 to prevent small cuttings from entering the housing 4.

The present invention is proposed to solve the above-mentioned problems, and it is therefore an object of the present invention to provide an image reader that can prevent such a document as a check or banknote from being jammed, that can be easily assembled and improve the reliability of carrying, and that enables higher-speed reading.

It is another object of the present invention to provide an image reader that can prevent motes from invading a housing from space between a transparent plate and the housing, and can be easily assembled.

DISCLOSURE OF THE INVENTION

In accordance with an aspect of the present invention, there is provided an image reader including: a light source for applying light to a document that is being carried on a transparent plate; an optical system for collecting light reflected from or passing through the document so as to generate optical information; a photoelectric conversion unit for converting the optical information output from the optical system into an electrical signal; and a housing for housing at least the transparent plate, the optical system, and the photoelectric conversion unit, the transparent plate having end portions that are chamfered in a direction in which the document is carried on the transparent plate.

As a result, a proper feeding operation and a proper reading operation can be carried out without occurrence of a paper jam even if the high-speed carrying causes a flapping of the document.

In an image reader in accordance with another aspect of the present invention, the transparent plate is engaged into recess portions formed in the housing.

As a result, a proper feeding operation and a proper reading operation can be carried out without occurrence of a paper jam even if the high-speed carrying causes a flapping of the document.

In an image reader in accordance with a further aspect of the present invention, the housing has end portions that are chamfered in the direction in which the document is carried on the transparent plate.

As a result, a proper feeding operation and a proper reading operation can be carried out without occurrence of a paper jam even if the high-speed carrying causes a flapping of the document.

In an image reader in accordance with another aspect of the present invention, the housing has end portions that are chamfered and face the end portions of the transparent plate that are chamfered in the direction in which the document is carried on the transparent plate, respectively.

As a result, the document can be prevented from being jammed even when it is carried from a horizontal surface of the transparent plate and along one chamfered end portion of the transparent plate.

In an image reader in accordance with a further aspect of the present invention, each of the chamfered end portions of the transparent plate has an angle ranging from 10 degrees to 40 degrees with respect to the direction in which the document is carried on the transparent plate.

As a result, the contact resistance to which the document is subjected when being carried can be further reduced, and high-speed carrying and reading operations are therefore enabled.

In an image reader in accordance with another aspect of the present invention, each of the chamfered end portions of the transparent plate has notched portions that are chamfered in the direction in which the document is carried on the transparent plate.

As a result, high-speed carrying and high-speed reading operations are enabled and the assembly of the image reader can be facilitated. Furthermore, the reliability of the image reader can be improved.

In an image reader in accordance with a further aspect of the present invention, the optical system collects light passing through the document being carried on the transparent plate.

As a result, a high-speed reading of simultaneously capturing images on both sides of such a document as a banknote is enabled and the assembly of the image reader can be facilitated. Furthermore, the reliability of the image reader can be improved.

In an image reader in accordance with another aspect of the present invention, each of the notched portions doesn't extend to a lower surface of the transparent plate.

As a result, small cuttings do not easily enter the housing and the assembly of the image reader is further facilitated.

In an image reader in accordance with a further aspect of the present invention, the transparent plate has positioning portions formed on a lower surface thereof, and the housing is secured to the transparent plate through the positioning portions of the transparent plate.

As a result, the accuracy of the mounting of the transparent plate to the housing can be improved and the high-speed carrying operation can be surely carried out.

In an image reader in accordance with another aspect of the present invention, the transparent plate has a groove that is formed in an upper surface thereof and is extending in the direction in which the document is carried thereon.

As a result, an atmospheric pressure difference caused in the image reader can be reduced, and therefore the carrying speed can be increased.

In an image reader in accordance with a further aspect of the present invention, the transparent plate has a projecting portion that is formed on an upper surface thereof, is extending in the direction in which the document is carried on the transparent plate, and serves as a guide for the document.

As a result, the document such as a banknote is prevented from being carried in a slanting direction.

In an image reader in accordance with another aspect of the present invention, the transparent plate has a projecting portion formed on an upper surface thereof, and the projecting portion of the transparent plate is engaged into the light source.

As a result, the mounting of the light source to the housing is further facilitated.

In an image reader in accordance with a further aspect of the present invention, the transparent plate has recess portions formed in a lower surface thereof, and the housing is engaged into the recess portions of the transparent plate.

As a result, the mounting of the transparent plate to the housing is further facilitated.

In an image reader in accordance with another aspect of the present invention, the transparent plate has projecting portions formed on a lower surface thereof, and the projecting portions of the transparent plate are engaged into the housing.

As a result, the mounting of the transparent plate to the housing is further facilitated.

In an image reader in accordance with a further aspect of the present invention, a binding material is filled into a contact portion between the transparent plate and the housing.

As a result, there is no space between the transparent plate and the housing and therefore small cuttings of such a document as a check or banknote can be prevented from entering the housing.

BRIEF DESCRIPTION OF THE FIGURES

FIG. 2(a) presents a case where the transparent plate is placed at a higher level than the housing, FIG. 2(b) presents an ideal case where the transparent plate is placed at the same level as the housing, and FIG. 2(c) presents a case where the transparent plate is placed at a lower level than the housing;

FIG. 28(a) is a perspective view of the transparent plate 1 having no notched portion that is chamfered and the combinational document guide 16a (or 16b) and FIG. 28(b) is a perspective view of the transparent plate 1 having notched portions that are chamfered and the combinational document guide 16a (or 16b).

PREFERRED EMBODIMENTS OF THE INVENTION

In order to explain the present invention in greater detail, the preferred embodiments will be described below with reference to the accompanying figures.

Embodiment 1

Figure 1:
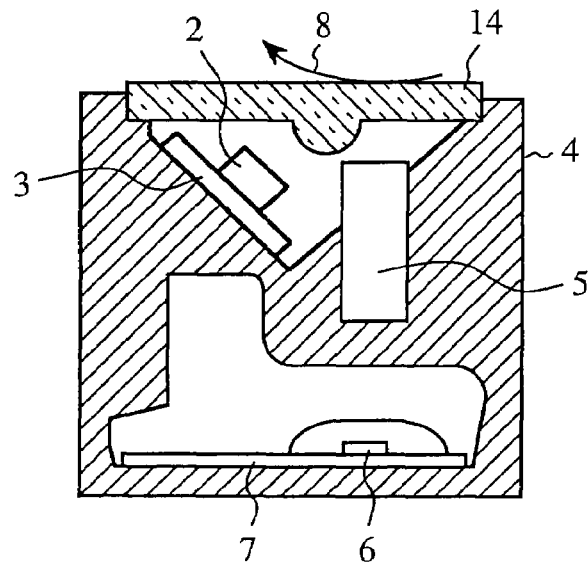
FIG. 1 is a cross-sectional view of a prior art image reader.
Figure 2:
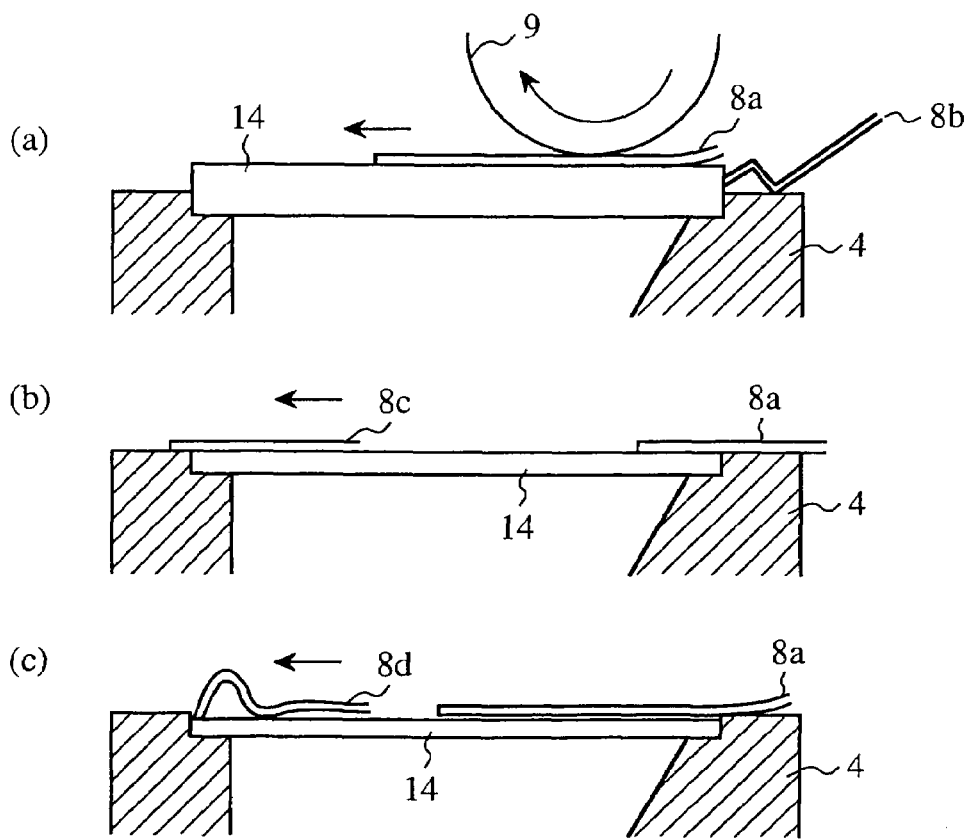
FIGS. 2(a) to 2(c) are cross-sectional enlarged views each showing a positional relationship between a housing and a transparent plate of the prior art image reader.
Figure 3:
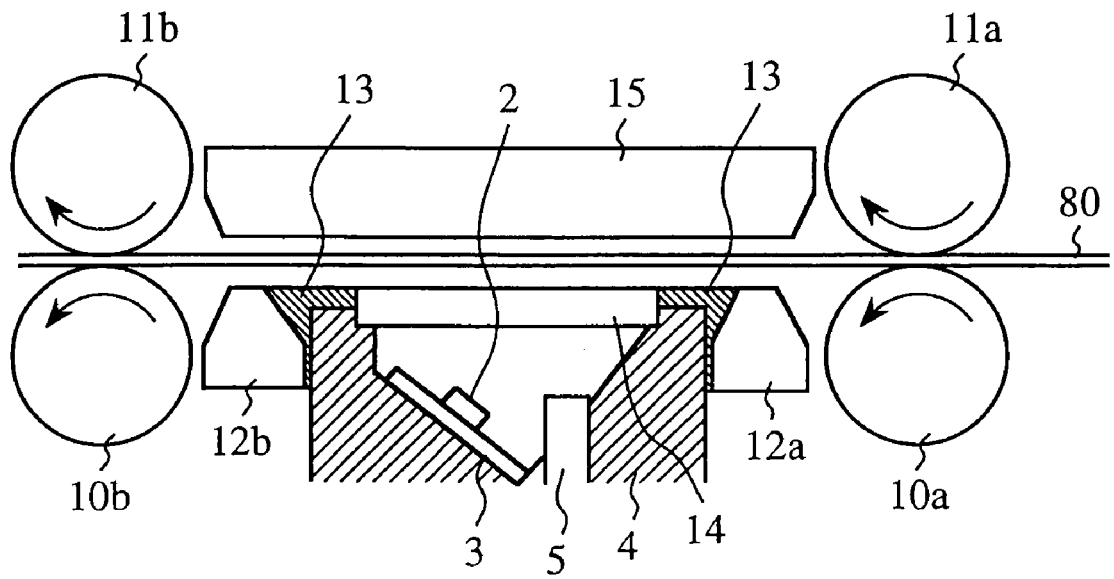
FIG. 3 is a cross-sectional view showing a prior art image reader that reads information on light reflected from a banknote.
Figure 4:
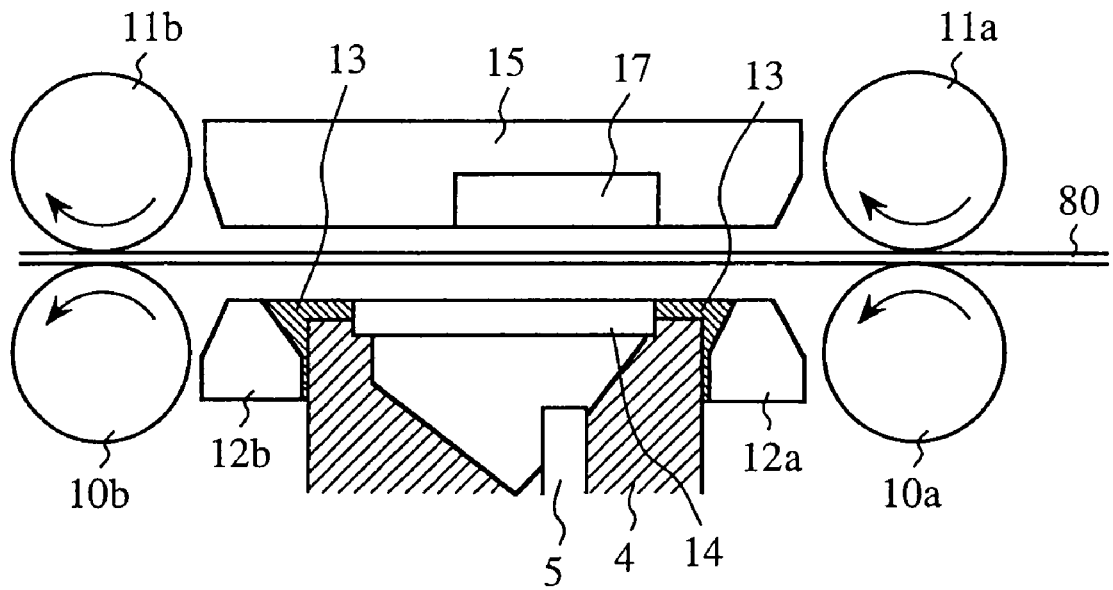
FIG. 4 is a cross-sectional view of a prior art image reader that reads information on light passed through a banknote.
Figure 5:
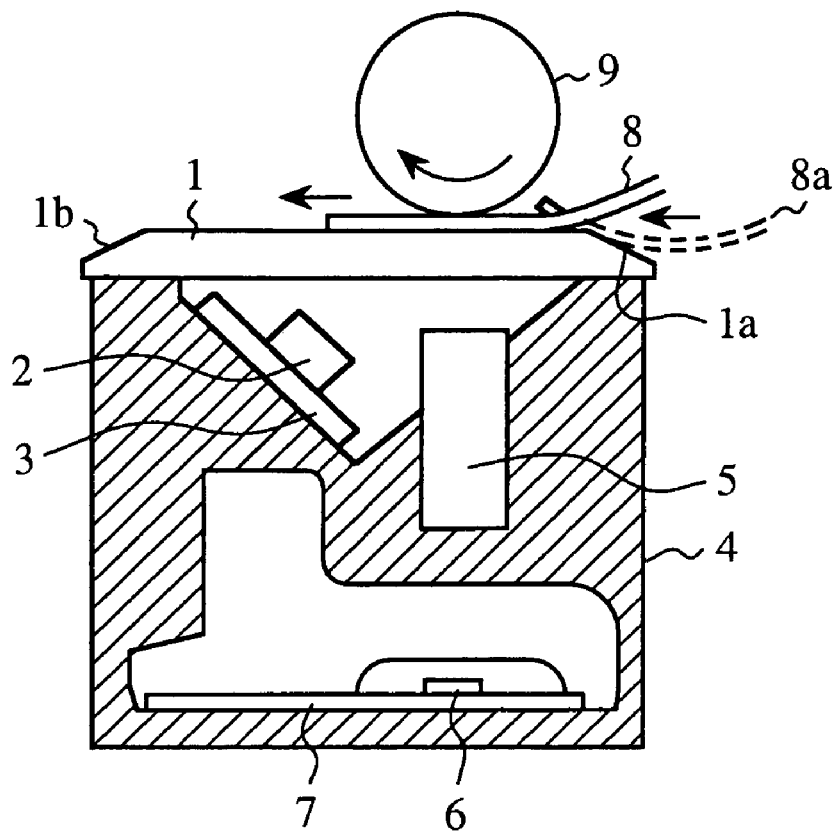
FIG. 5 is a cross-sectional view showing an image reader and carrying of a document in accordance with embodiment 1 of the present invention.

FIG. 5 is a cross-sectional view showing an image reader and carrying of a document in accordance with embodiment 1 of the present invention. In FIG. 5, reference numeral 8 denotes a document, such as a check, whose image is being captured by the image reader, reference numeral 7 denotes a photoelectric conversion unit having a photoelectric transducer 6 aligned in a line, reference numeral 3 denotes a line light source for uniformly applying light to the document 8, the line light source having a plurality of light emitting elements 2 arranged in a line on a substrate for light source, the plurality of light emitting elements consisting of a light emitting diode (LED) chip, for example, reference numeral 1 denotes a transparent plate located under the document 8, the transparent plate 1 consisting of a glass plate, for example, and having end portions 1a and 1b that are chamfered in a direction in which the document 8 is carried, reference numeral 5 denotes an optical system (e.g., a rod lens array) located above the photoelectric transducer 6, for converting light and shade information on the document 8 into an erect image having the same size as the light and shade information, reference numeral 4 denotes a housing for housing the photoelectric conversion unit 7, the line light source 3, the transparent plate 1, and the optical system 5, the housing constituting the image reader, and reference numeral 9 denotes a roller for carrying the document 8 in a direction of an arrow (i.e., a direction from the right to the left in FIG. 5).

Next, a description will be made as to an operation of the image reader in accordance with embodiment 1 of the present invention.

Light emitted out of the light source 3 is uniformly applied to the document 8. Light reflected from the document 8 is then formed into an erect imaged having the same size as the object on the photoelectric transducer unit 6 by the optical system 5 (e.g., a rod lens array) fixedly held in the housing 4, and is amplified after converted into an electrical signal. Then, even if the document 8 being read flaps because it is carried at a high speed and is then placed at a position 8a as shown in FIG. 5, the document is carried along the chamfered end portion 1a of the transparent plate 1 and then reaches the roller 9. As a result, the document 8 can be carried properly and an image of the document can be captured at a high speed.

As shown in FIG. 5, because the transparent plate 1 is provided with the chamfered end portions 1a and 1b that are chamfered in the direction in which the document is carried, the image reader can support bidirectional carrying of documents. Furthermore, it is needless to say that each of the chamfered end portions 1a and 1b has an angle with respect to the direction in which the document being read is carried on the transparent plate, the angle being optimized according to the size of the document 8 and the carrying speed or the size of the transparent plate 1 and so on.

As mentioned above, the image reader in accordance with this embodiment 1 is provided with the light source 3 for applying light to the document 8 that is being carried on the transparent plate 1, the optical system 5 for collecting light reflected from or passing through the document 8 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1a and 1b that are chamfered in a direction in which the document is carried on the transparent plate.

As can be seen from the above description, in accordance with this embodiment 1, because the transparent plate 1 is so constructed that their end portions are chamfered in the direction in which the document is carried on the transparent plate, a proper feeding operation and a proper reading operation can be carried out without occurrence of a paper jam even if the high-speed carrying causes a flapping of the document.

Embodiment 2

Figure 6:
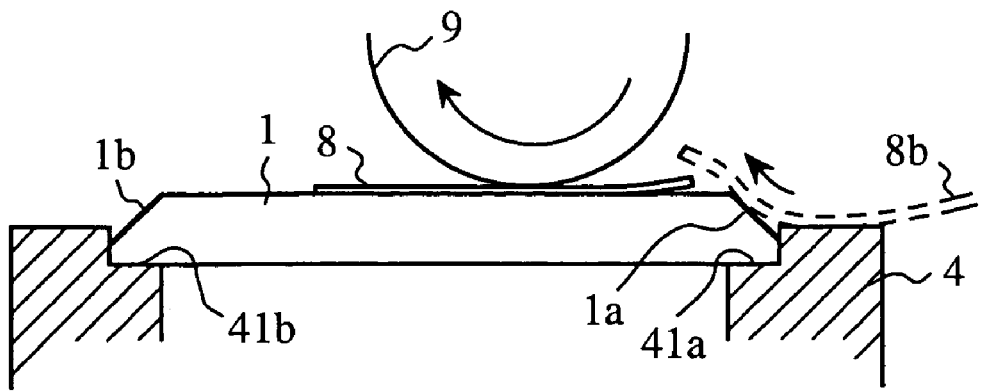
FIG. 6 is a cross-sectional view showing an image reader and carrying of a document in accordance with embodiment 2 of the present invention.
Figure 7:
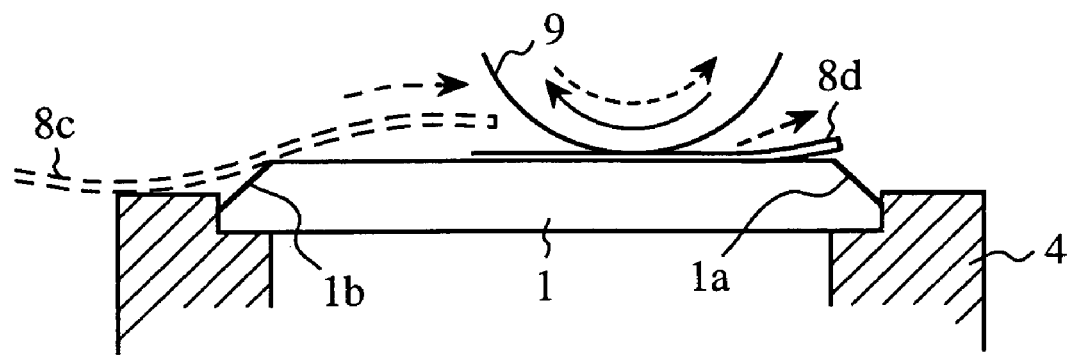
FIG. 7 is a cross-sectional view showing carrying of a document that is carried in an opposite direction in the image reader of FIG. 6.

FIG. 6 is a cross-sectional view showing an image reader and carrying of a document in accordance with embodiment 2 of the present invention, and FIG. 7 is a cross-sectional view showing a document that is carried in an opposite direction in the image reader of FIG. 6. The image reader in accordance with embodiment 2 differs from that of embodiment 1 in that a transparent plate 1 is provided with chamfered end portions 1a and 1b that are engaged into recess portions 41a and 41b formed in an upper surface of a housing 4.

Next, a description will be made as to an operation of the image reader in accordance with embodiment 2 of the present invention.

The image reader in accordance with embodiment 2 performs an operation of capturing an image of a document 8 in the same way that that of embodiment 1 does, and therefore the explanation of the image capturing operation will be omitted hereafter. The image reader in accordance with embodiment 2 differs from that of embodiment 1 in the positional relationship between the transparent plate 1 and the housing 4. In accordance with this embodiment, because the transparent plate 1 is so arranged that a lower edge of the chamfered end portion 1a is lower than the upper surface of the housing 4, the document 8 can be carried along the housing 4 and the chamfered end portion 1a of the transparent plate 1 even if the document 8 is placed at a position 8b. Furthermore, as shown in FIG. 7, the document 8 can be carried opposite to the direction of the above-mentioned normal carrying, which is designated by a dashed arrow, and along the housing and the chamfered end portion 1b of the transparent plate 1.

In accordance with embodiment 2, as shown in FIG. 6, because the chamfered end portions 1a and 1b of the transparent plate 1 are engaged into the recess portions 41a and 41b formed in the housing 4 so that the lower edge of the chamfered end portion 1a of the transparent plate 1 is lower than the upper end of the housing 4, the head of the document 8 running along the upper surface of the housing 4 can be prevented from coming into contact with a vertical surface of the transparent plate 1 including the lower edge of the chamfered end portion 1a.

Thus, in accordance with embodiment 2, proper carrying of the document 8, capturing of an image of the document 8, and reverse carrying of the document 8 can be carried out more effectively as compared with the image reader of embodiment 1 even if the high-speed carrying causes a larger flapping of the document.

As mentioned above, the image reader in accordance with this embodiment 2 is provided with the light source 3 for applying light to the document 8 that is being carried on the transparent plate 1, the optical system 5 for collecting light reflected from or passing through the document 8 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1a and 1b that are chamfered in a direction in which the document is carried on the transparent plate and that are engaged into recess portions 41a and 41b formed in the housing 4.

As can be seen from the above description, in accordance with this embodiment 2, because the transparent plate 1 is so constructed that their end portions are chamfered in the direction in which the document is carried on the transparent plate and are engaged into the recess portions formed in the housing, a proper carrying operation and a proper reading operation can be carried out without occurrence of a paper jam even if the high-speed carrying causes a flapping of the document.

Embodiment 3

Figure 8:
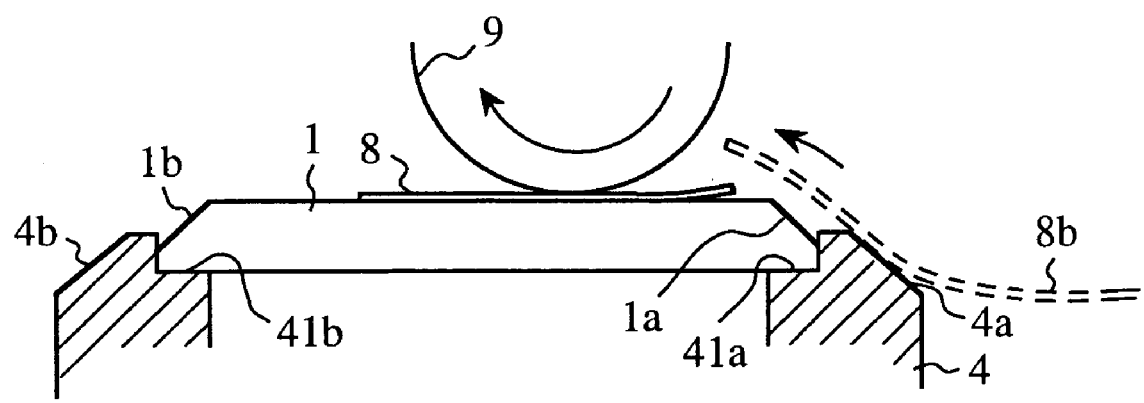
FIG. 8 is a cross-sectional view showing an image reader and carrying of a document in accordance. with embodiment 3 of the present invention.

FIG. 8 is a cross-sectional view showing an image reader and carrying of a document in accordance with embodiment 3 of the present invention. The image reader in accordance with embodiment 3 differs from that of embodiment 2 in the shape of a housing 4. The housing 4 has end portions 4a and 4b that are chamfered in a direction in which the document is carried.

Next, a description will be made as to an operation of the image reader in accordance with embodiment 3 of the present invention.

The image reader in accordance with embodiment 3 performs an operation of capturing an image of the document 8 in the same way that that of embodiment 2 does, and therefore the explanation of the image capturing operation will be omitted hereafter. The image reader in accordance with embodiment 3 differs from that of embodiment 2 in that the chamfered end portion 4a is formed in the housing 4, and therefore the document 8 placed at a position of 8b can be prevented from coming into contact with a lateral surface of the housing 4 so that a paper jam does not occur and the document 8 can be carried along the housing 4, the transparent plate 1, and the roller 9.

Thus, in accordance with embodiment 3, proper carrying of the document 8, capturing of an image of the document 8, and reverse carrying of the document 8 can be carried out at a higher speed as compared with the image reader of embodiment 2 even if the high-speed carrying causes a larger flapping of the document.

As mentioned above, the image reader in accordance with this embodiment 3 is provided with the light source 3 for applying light to the document 8 that is being carried on the transparent plate 1, the optical system 5 for collecting light reflected from or passing through the document 8 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1a and 1b that are chamfered in a direction in which the document is carried on the transparent plate and that are engaged into recess portions 41a and 41b formed in the housing 4, and the housing 4 having end portions 4a and 4b that are chamfered in the direction in which the document is carried.

As can be seen from the above description, in accordance with this embodiment 3, because the transparent plate is so constructed that their end portions are chamfered in the direction in which the document is carried on the transparent plate and the housing is so constructed that their end portions are chamfered in the direction in which the document is carried, a proper carrying operation and a proper reading operation can be carried out without occurrence of a paper jam even if the high-speed carrying causes a flapping of the document.

Embodiment 4

Figure 9:
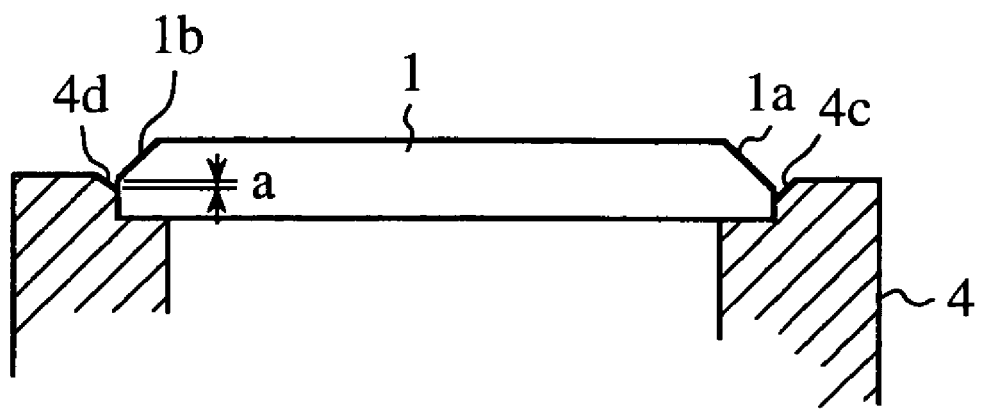
FIG. 9 is a cross-sectional view showing an image reader in accordance with embodiment 4 of the present invention.
Figure 10:
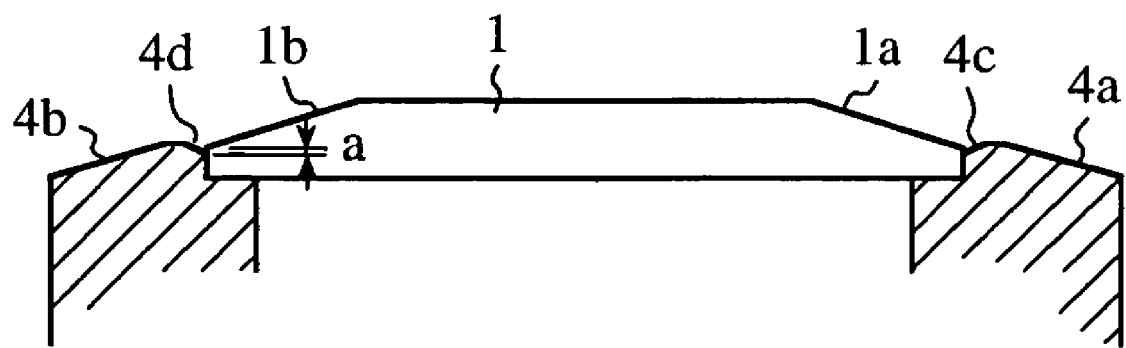
FIG. 10 is a cross-sectional view showing an image reader in accordance with embodiment 4 of the present invention.

FIGS. 9 and 10 are cross-sectional views of an image reader in accordance with embodiment 4 of the present invention. The image reader in accordance with embodiment 4 differs from those of embodiments 2 and 3 in that a housing 4 has chamfered portions 4c and 4d facing the chamfered end portions 1a and 1b of a transparent plate 1, respectively.

Next, a description will be made as to an operation of the image reader in accordance with embodiment 4 of the present invention.

The image reader in accordance with embodiment 4 performs an operation of capturing an image of a document 8 in the same way that those of embodiments 2 and 3 do, and therefore the explanation of the image capturing operation will be omitted hereafter. The image reader in accordance with embodiment 4 differs from those of embodiments 2 and 3 in that because the chamfered end portions 1a and 1b of the transparent plate 1 have respective lower edges higher than those of the chamfered portions 4c and 4d of the housing 4, respectively, (that is, the distance a shown in FIGS. 9 and 10 is equal to or larger than 0 (a≠0)), the document can be prevented from getting snagged on the housing 4 so that the image reader does not have a paper jam even when the head of the document 8 whose image has been captured is carried along the chamfered end portion 1b of the transparent plate 1 or even when the trailing end of the document 8 is carried opposite to the direction of normal carrying toward the chamfered end portion 1a.

As mentioned above, the image reader in accordance with this embodiment 4 is provided with the light source 3 for applying light to the document 8 that is being carried on the transparent plate 1, the optical system 5 for collecting light reflected from or passing through the document 8 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1a and 1b that are chamfered in a direction in which the document is carried on the transparent plate and that are engaged into recess portions 41a and 41b formed in the housing 4. Furthermore, in the image reader of this embodiment 4, the housing 4 has chamfered portions 4c and 4d facing the end portions 1a and 1b of the transparent plate 1 that are chamfered in the direction in which the document is carried on the transparent plate, respectively.

As can be seen from the above description, in accordance with this embodiment 4, because the housing is so constructed that their end portions respectively facing the chamfered end portions of the transparent plate are chamfered in the direction in which the document is carried on the transparent plate, the document can be prevented from being jammed even when it is carried from a horizontal surface of the transparent plate and along one chamfered end portion of the transparent plate.

Embodiment 5

Figure 11:
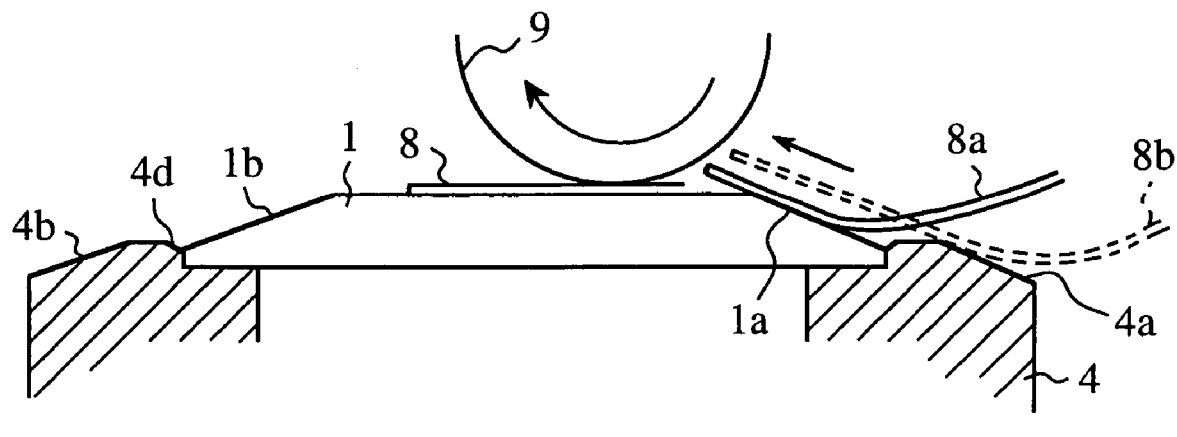
FIG. 11 is a cross-sectional view showing an image reader and carrying of a document in accordance with embodiment 5 of the present invention.

FIG. 11 is a cross-sectional view showing an image reader and carrying of a document in accordance with embodiment 5 of the present invention. The image reader in accordance with embodiment 5 differs from that of embodiment 4 in that the chamfered end portions 1a and 1b of a transparent plate 1 have a chamfering angle of 10 to 40 degrees with respect to a direction in which a document is carried.

Next, a description will be made as to an operation of the image reader in accordance with embodiment 5 of the present invention.

The image reader in accordance with embodiment 5 performs an operation of capturing an image of a document 8 in the same way that that of embodiment 4 does, and therefore the explanation of the image capturing operation will be omitted hereafter. The image reader in accordance with embodiment 5 differs from that of embodiment 4 in that because the chamfered end portions 1a and 1b of the transparent plate 1 have a chamfering angle of 10 to 40 degrees with respect to the horizontal direction, the contact resistance to which the document is subjected becomes further smaller than that in the case of embodiment 4, and smooth carrying is enabled and high-speed carrying and reading operations are therefore enabled.

When the chamfering angle is equal to or less than 10 degrees, the contact resistance to which the document is subjected when being carried is hardly improved. In this case, the width of the transparent plate is increased, and this results in upsizing of the image reader.

As mentioned above, the image reader in accordance with this embodiment 5 is provided with the light source 3 for applying light to the document 8 that is being carried on the transparent plate 1, the optical system 5 for collecting light reflected from or passing through the document 8 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1a and 1b that are chamfered in a direction in which the document is carried on the transparent plate and that are engaged into recess portions 41a and 41b formed in the housing 4. Furthermore, in the image reader of this embodiment 5, the housing 4 has chamfered portions 4c and 4d facing the end portions 1a and 1b of the transparent plate 1 that are chamfered in the direction in which the document is carried on the transparent plate, respectively, and each of the chamfered end portions 1a and 1b of the transparent plate 1 has a chamfering angle of 10 to 40 degrees with respect to the direction in which the document is carried.

As can be seen from the above description, in accordance with this embodiment 5, because at least the end portions of the transparent plate are chamfered in the direction in which the document is carried on the transparent plate and each of the chamfered end portions of the transparent plate has a chamfering angle of 10 to 40 degrees the direction in which the document is carried, the contact resistance to which the document is subjected when being carried can be further reduced, and high-speed carrying and reading operations are therefore enabled.

Embodiment 6

Figure 12:
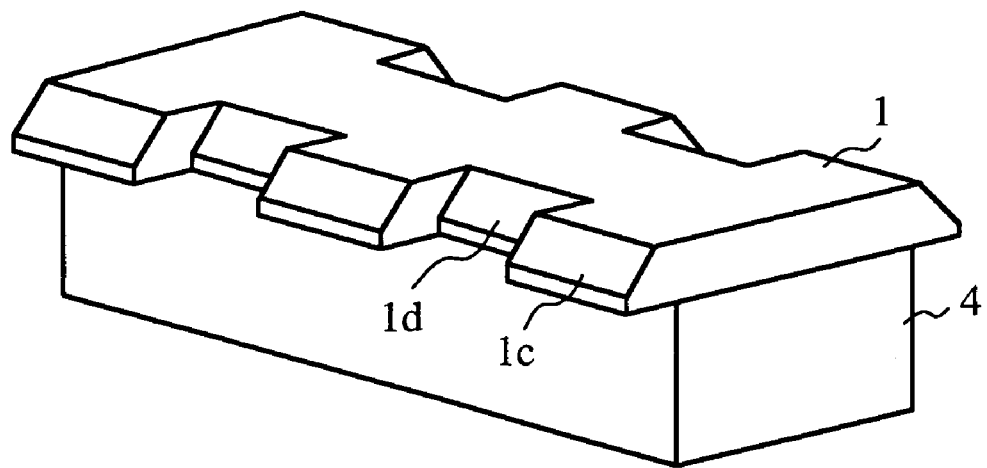
FIG. 12 is a perspective view showing an image reader in accordance with embodiment 6 of the present invention.
Figure 13:
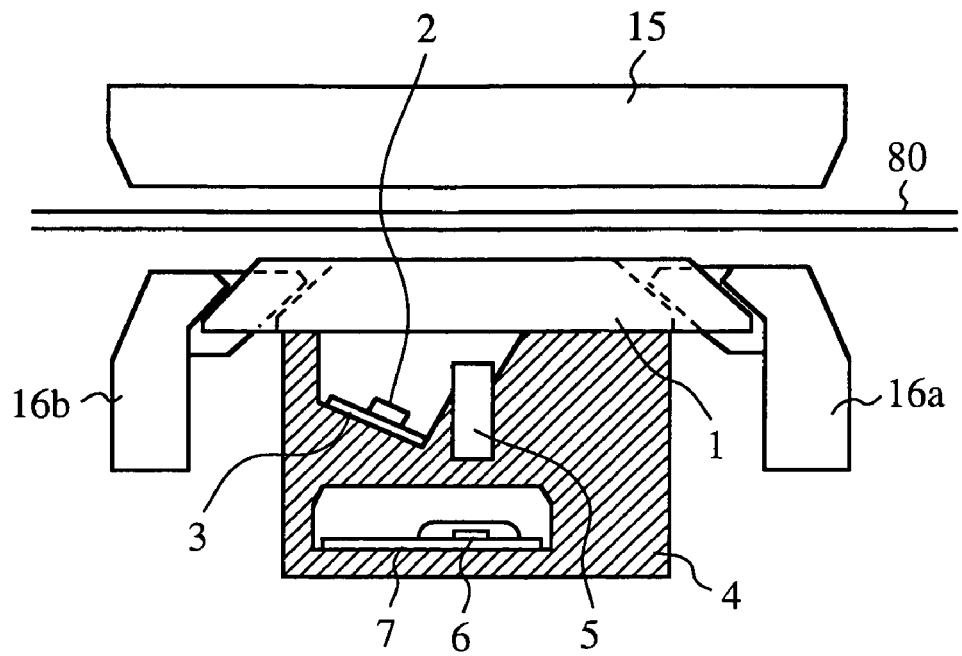
FIG. 13 is a cross-sectional view showing the image reader of FIG. 12 and carrying of a document.

FIG. 12 is a perspective view of an image reader in accordance with embodiment 6 of the present invention, and FIG. 13 is a cross-sectional view showing the image reader of FIG. 12 and carrying of a banknote. In FIGS. 12 and 13, reference numeral 80 denotes the banknote that is a document whose image is being captured by the image reader, reference numeral 7 denotes a photoelectric conversion unit having a photoelectric transducer 6 aligned in a line, reference numeral 3 denotes a line light source for uniformly applying light to the banknote 80, the line light source having a plurality of light emitting elements 2 arranged in a line on a substrate for light source, the plurality of light emitting elements consisting of a light emitting diode (LED) chip, for example, and reference numeral 1 denotes a transparent plate located under the banknote 80, the transparent plate consisting of a glass plate, for example, and having portions 1c that are chamfered in a direction in which the banknote is carried and notched portions 1d that are chamfered in the direction in which the banknote is carried at both ends thereof.

Reference numeral 5 denotes an optical system (e.g., a rod lens array) located above the photoelectric transducer 6, for converting light and shade information on the banknote 80 into an erect image having the same size as the light and shade information, reference numeral 4 denotes a housing for housing the photoelectric conversion unit 7, the line light source 3, the transparent plate 1, and the optical system 5, the housing constituting the image reader, and reference numerals 16a and 16b denotes combinational document carrying guides each having chamfered end portions engaged with the chamfered end portions 1c of the transparent plate 1 and chamfered end portions engaged with the chamfered, notched portions 1d of the transparent plate 1. Each of the two combinational document carrying guides 16a and 16b has a longitudinal length that is almost equal to the longitudinal length of the transparent plate 1.

Next, a description will be made as to an operation of the image reader in accordance with embodiment 6 of the present invention.

As in the case of the prior art image reader, light emitted out of the light source 3 is uniformly applied to the banknote 80, and light reflected from the banknote 80 is formed into an erect image having the same size as the object on the photoelectric transducer unit 6 by the optical system 5 (e.g., a rod lens array) fixedly held in the housing 4, and is then amplified after converted into an electrical signal.

Figure 28:
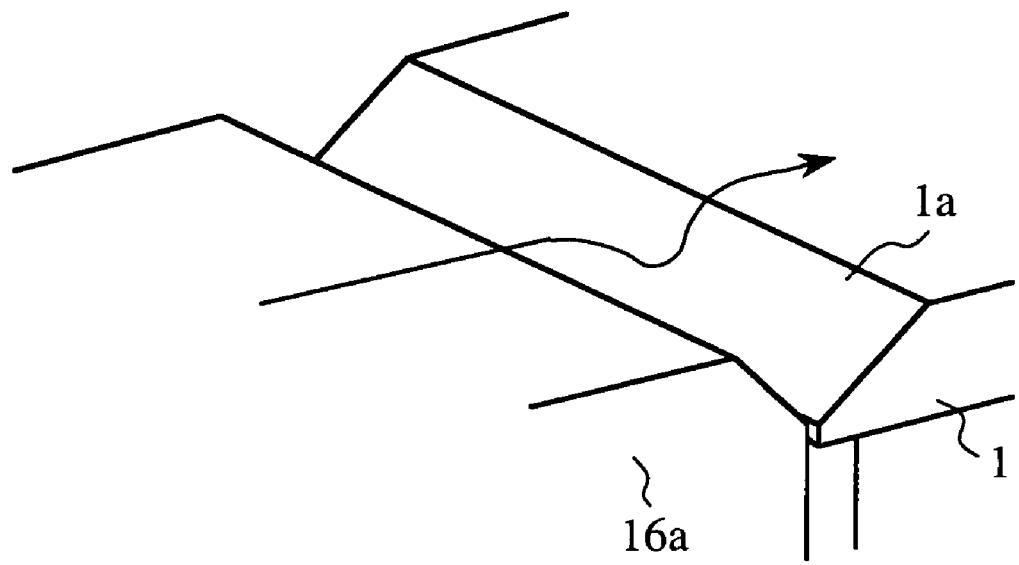
FIGS. 28(a) and 28(b) are perspective views showing a transparent plate 1 and a combinational document guide 16a (or 16b) of an image reader in accordance with this embodiment 6.
Figure 28:
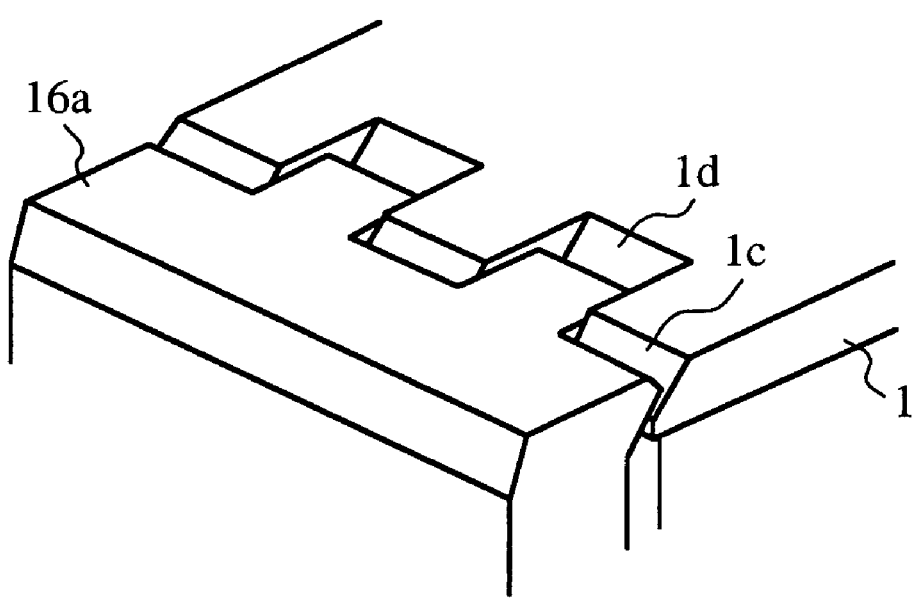

FIGS. 28(a) and 28(b) are perspective views each showing an operation of a combination of the transparent plate 1 of the image reader in accordance with this embodiment 6 and the combinational document guide 16a (or 16b). FIG. 28(a) shows the transparent plate 1 having no notched, chamfered portions and the combinational document guide 16a (or 16b) having no notched, chamfered portions, and FIG. 28(b) shows the transparent plate 1 having notched, chamfered portions and the combinational document guide 16a (or 16b) having corresponding notched, chamfered portions.

As shown in FIG. 28(a), when the transparent plate 1 has no notched, chamfered portions and the combinational document guide 16a (or 16b) has no notched, chamfered portions, the leading end of the banknote 80 might touch a chamfered end portion 1a of the transparent plate 1 over the width and at the same time, so that a paper jam can occur.

In contrast, in accordance with this embodiment 6, as shown in FIG. 28(b), because the transparent plate 1 has notched, chamfered portions and the combinational document guide 16a (or 16b) has corresponding notched, chamfered portions, when part of the leading end of banknote 80 comes into contact with the chamfered end portions 1c of the transparent plate 1, remaining part of the leading end of the banknote 80 does not reach the notched, chamfered portions 1d of the transparent plate 1. On the other hand, the above-mentioned part of the banknote 80 has already passed through the chamfered end portions 1c of the transparent plate 1 when the other part of the banknote 80 comes into contact with the notched, chamfered portions 1d of the transparent plate 1.

Therefore, the leading end of the banknote 80 can be prevented from being jammed over the width thereof and at the same time by the chamfered end portions that are respectively formed in the transparent plate 1 and the combinational document carrying guide 16 so that they are alternately arranged along the width of the transparent plate. As a result, high-speed carrying and hence high-speed reading operations are enabled. When the image reader is assembled, the combinational document carrying guide 16 only has to be placed at the same level as the transparent plate 1 or at a slightly-lower level. Because the vertical position of the document carrying guide is thus adjusted so that the document carrying guide is placed at the same level as the transparent plate 1 or at a slightly-lower level and the space between them need not be filled with resin, the assembly of the image reader can be facilitated and the reliability of the image reader can be improved.

As shown in FIGS. 12 and 13, two notched portions 1d are formed in each of the two end portions of the transparent plate 1 that are aligned in the direction in which the banknote is carried so that the two notched portions 1d formed in one of the two end portions face those formed in the other end portion, respectively. The inventors have learned by experimental trial that when only one notched portion is formed in each of the two end portions of the transparent plate 1, a banknote or the like having a bend or broken part encounters a paper jam on rare occasion, while such a paper jam can be effectively prevented from occurring when three or more notched portions are formed in each of the two end portions of the transparent plate 1. However, the larger number of notched portions 1d is formed in each of the two end portions of the transparent plate 1, the more difficult to manufacture the transparent plate 1 and the combinational document carrying guides 16a and 16b and to attach them to each other. Therefore, it is needless to say that the number and positions of notched portions and the chamfering angle of the notched, chamfered portions can be optimized according to the size of the banknote 80, the carrying speed, the position of the banknote 80 carried on the transparent plate 1, the size of the transparent plate 1, and so on.

As mentioned above, the image reader in accordance with this embodiment 6 is provided with the light source 3 for applying light to the banknote 80 that is being carried on the transparent plate 1, the optical system 5 for collecting light reflected from or passing through the banknote 80 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1c that are chamfered in a direction in which the banknote is carried on the transparent plate and each of the end portions 1c having notched portions 1d that are chamfered in the direction in which the banknote is carried.

As can be seen from the above description, in accordance with this embodiment 6, because the transparent plate has end portions that are chamfered in the direction in which the banknote is carried on the transparent plate, each of the end portions has chamfered, notched portions, and combinational document carrying guides are engaged with the chamfered, notched end portions of the transparent plate, high-speed carrying and high-speed reading operations are enabled and the assembly of the image reader can be facilitated. Furthermore, the reliability of the image reader can be improved.

Embodiment 7

Figure 14:
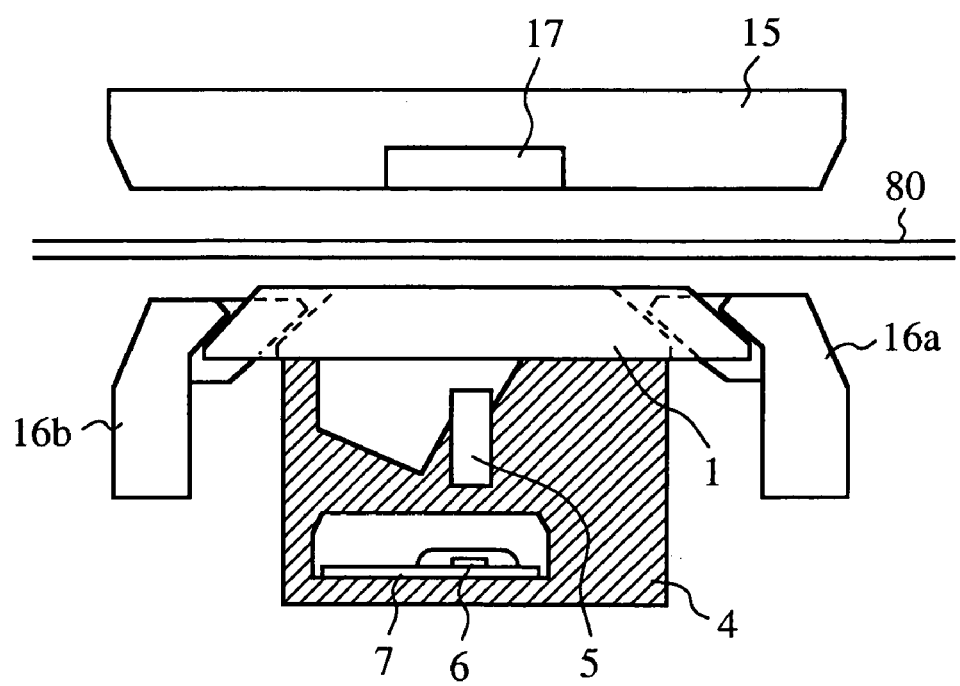
FIG. 14 is a cross-sectional view showing an image reader using a transmission-type light source and carrying of a document in accordance with embodiment 7 of the present invention.

FIG. 14 is a cross-sectional view showing an image reader using a transmission-type light source and carrying of a banknote in accordance with embodiment 1 of the present invention. In FIG. 14, reference numeral 80 denotes the banknote that is a document whose image is being captured by the image reader, reference numeral 7 denotes a photoelectric conversion unit having a photoelectric transducer 6 aligned in a line, reference numeral 17 denotes a transmission-type light source disposed within a document guide 15 located above the banknote 80, for uniformly applying light to the banknote 80, the line light source having a plurality of light emitting elements 2 arranged in a line on a substrate for light source, and the plurality of light emitting elements consisting of a light emitting diode (LED) chip, for example, reference numeral 1 denotes a transparent plate located under the banknote 80, the transparent plate consisting of a glass plate, for example, and having portions 1c that are chamfered in a direction in which the banknote is carried and notched portions 1d that are chamfered in the direction in which the banknote is carried at both ends thereof, reference numeral 5 denotes an optical system (e.g., a rod lens array) located above the photoelectric transducer 6, for converting light and shade information on the banknote 80 into an erect image having the same size as the light and shade information, reference numeral 4 denotes a housing for housing the photoelectric conversion unit 7, the line light source 3, the transparent plate 1, and the optical system 5, the housing constituting the image reader, and reference numerals 16a and 16b denotes combinational document carrying guides each having chamfered end portions engaged with the chamfered end portions 1c of the transparent plate 1 and chamfered end portions engaged with the chamfered, notched portions 1d.

Next, a description will be made as to an operation of the image reader in accordance with embodiment 1 of the present invention.

The image reader in accordance with embodiment 7 performs an operation of carrying the banknote 80 in the same way that that of embodiment 6 does, and differs from that of embodiment 6 in the position of the light source. Because the use of the transmission-type light source 17 makes it possible to make light pass through the banknote 80 so as to read information on the banknote so that specific information on both sides of the banknote 80 can be read at the same time, a higher-speed reading operation can be carried out as compared with embodiment 1. Furthermore, even when the banknote 80 has a bend or broken part, the image reader can recognize the banknote 80 at once, and can also find out a reading trouble and carry it opposite to the direction in which the banknote 80 is inserted.

It is needless to say that the same advantage is provided when the image of the banknote 80 is captured from both the information obtained from light emitted out of the transmission-type light source 17 and passing through the banknote 80 and information obtained from light emitted out of a light source 3, which the image reader in accordance with embodiment 6 employs, and reflected from the banknote 80.

As mentioned above, the image reader in accordance with this embodiment 7 is provided with the light source 17 for applying light to the banknote 80 that is being carried on the transparent plate 1, the optical system 5 for collecting light passing through the banknote 80 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1c that are chamfered in a direction in which the banknote is carried on the transparent plate and each of the end portions 1c having notched portions 1d that are chamfered in the direction in which the banknote is carried, and the optical system 5 collecting light passing through the banknote 80 being carried on the transparent plate 1.

As can be seen from the above description, in accordance with this embodiment 7, because the transparent plate has end portions that are chamfered in the direction in which the banknote is carried on the transparent plate, each of the end portions has chamfered, notched portions, and combinational document carrying guides are engaged with the chamfered, notched end portions of the transparent plate, a high-speed reading of simultaneously capturing images on both sides of the banknote is enabled and the assembly of the image reader can be facilitated. Furthermore, the reliability of the image reader can be improved.

Embodiment 8

Figure 15:
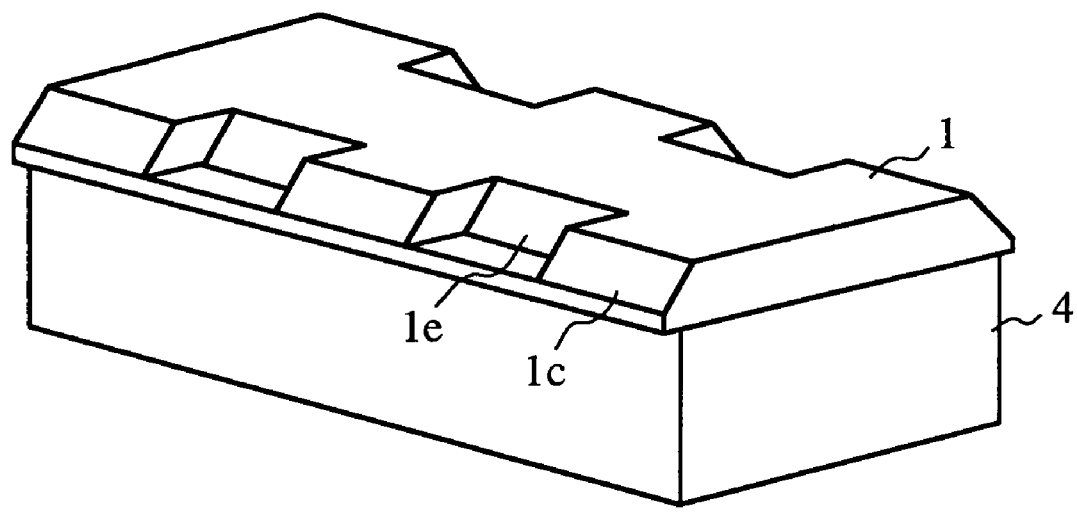
FIG. 15 is a perspective view showing an image reader in accordance with embodiment 8 of the present invention.
Figure 16:
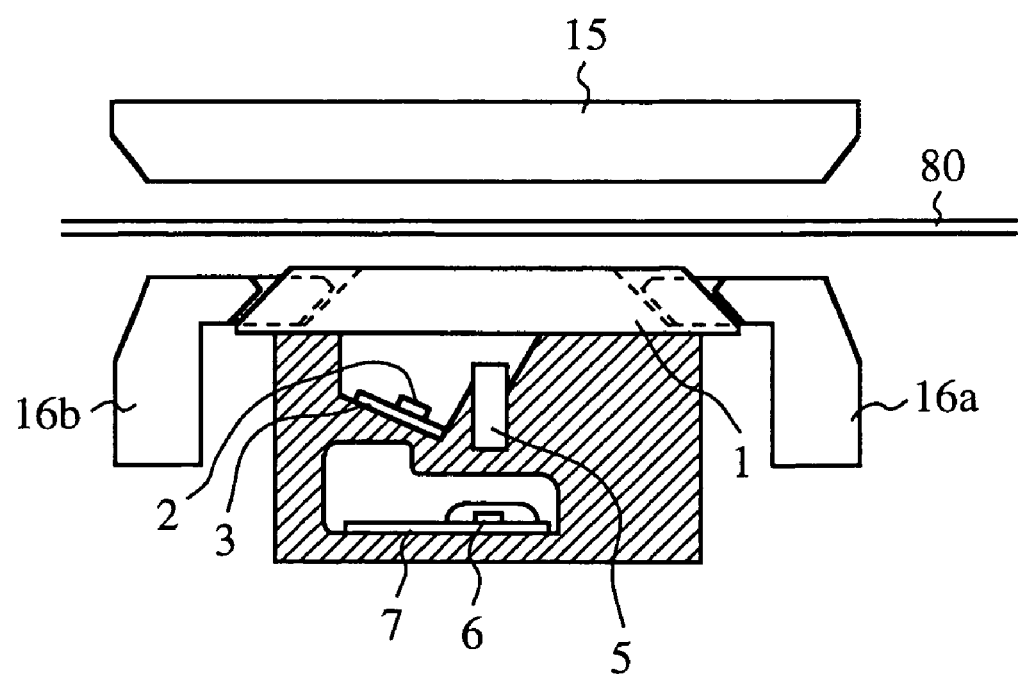
FIG. 16 is a cross-sectional view showing the image reader of FIG. 15 and carrying of a document.

FIG. 15 is a perspective view of an image reader in accordance with embodiment 8 of the present invention, and FIG. 16 is a cross-sectional view showing the image reader of FIG. 15 and carrying of a banknote. The image reader in accordance with embodiment 8 differs from that of embodiment 6 in the shape of a transparent plate 1 and the shapes of combinational document carrying guides. In FIG. 16, the transparent plate 1 has notched portions 1e that do not extend to a lower surface of the transparent plate 1, and the document carrying guides 16a and 16b are engaged into the terraced portions 1e formed in two ends of the transparent plate 1.

Next, a description will be made as to an operation of the image reader in accordance with embodiment 8 of the present invention.

The image reader in accordance with embodiment 8 performs an operation of carrying a banknote 80 in the same way that that of embodiment 6 or 7 does, and therefore the explanation of the carrying operation will be omitted hereafter. Unlike the image readers in accordance with embodiments 6 and 7, because a housing 4 is located under the transparent plate 1 and the notched portions 1e do not extend to the lower surface of the transparent plate 1, small cuttings of the banknote 80 do not easily enter a gap between the transparent plate 1 and the housing 4. In addition, because the transparent plate 1 is wider than the housing 4, it is easy to install all the components into the housing 4. The document carrying guides 16a and 16b only have to be placed on the recessed portions formed in the two ends of the transparent plate 1, and it is therefore easy to assemble the image reader of this embodiment.

As mentioned above, the image reader in accordance with this embodiment 8 is provided with the light source 3 for applying light to the banknote 80 that is being carried on the transparent plate 1, the optical system 5 for collecting light reflected from or passing through the banknote 80 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1c that are chamfered in a direction in which the banknote is carried on the transparent plate and each of the end portions 1c having notched portions 1e that do not extend to a lower surface of the transparent plate 1.

As can be seen from the above description, in accordance with this embodiment 8, because the document carrying guides are placed on and engaged into the notched portions of the transparent plate that do not extend to the lower surface of the transparent plate, small cuttings of the banknote do not easily enter the housing and the assembly of the image reader is further facilitated.

Embodiment 9

Figure 17:
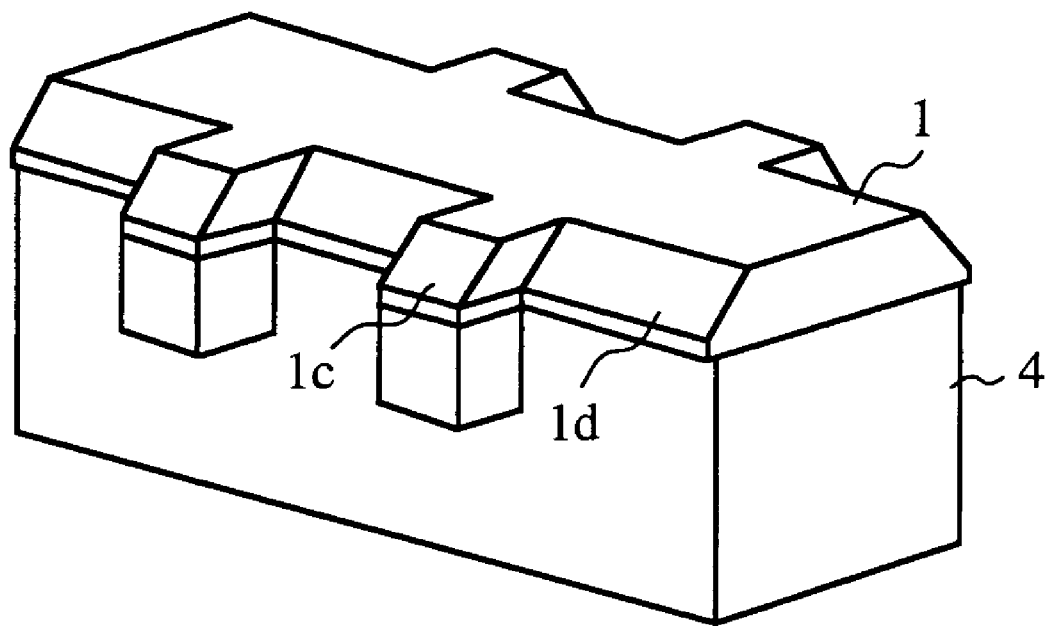
FIG. 17 is a perspective view showing an image reader in accordance with embodiment 9 of the present invention.
Figure 18:
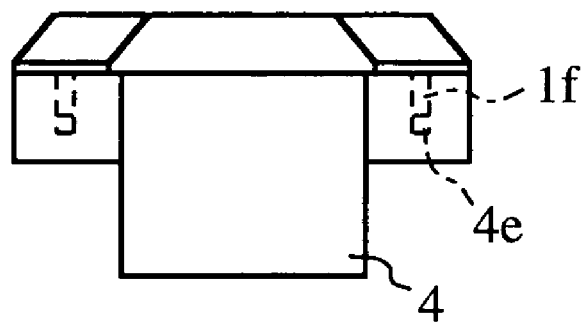
FIG. 18 is a side view showing the image reader in accordance with embodiment 9 of the present invention.

FIG. 17 is a perspective view of an image reader in accordance with embodiment 9 of the present invention, and FIG. 18 is a side view of the image reader in accordance with embodiment 9 of the present invention. The image reader in accordance with embodiment 9 differs from those of embodiments 6 and 7 in that positioning portions 1f are formed on a lower surface of a transparent plate 1 and positioning portions 4e are formed in an upper surface of a housing 4.

Next, a description will be made as to an operation of the image reader in accordance with embodiment 9 of the present invention.

The image reader in accordance with embodiment 9 performs an operation of carrying a banknote 80 in the same way that that of embodiment 6 or 7 does, and therefore the explanation of the carrying operation will be omitted hereafter. Unlike the image readers in accordance with embodiments 6 and 7, as shown in FIG. 18, because the positioning portions 1f each consisting of a projection formed on the lower surface of the transparent plate 1 are engaged into the housing positioning portions 4e each consisting of a hole, the transparent plate 1 can be easily mounted to the housing 4 and therefore the accuracy of the mounting of the transparent plate 1 to the housing 4, such as assembly parallelism, can be improved. The accuracy of the direction in which the transparent plate 1 is chamfered and the orientation of the banknote 80 with respect to the direction in which the banknote 80 is carried can be improved and therefore the carrying of the banknote 80 can be surely carried out.

As shown in FIG. 18, the positioning portions 1f of the transparent plate 1, each of which consists of a projection, and the housing positioning portions 4e, each of which consists of a hole, are both shaped like a circular cylinder. It is needless to say that the number, positions, and shape of positioning portions if and the number, positions, and shape of housing positioning portions 4e are limited to the above-mentioned exemplary ones.

As mentioned above, the image reader in accordance with this embodiment 9 is provided with the light source 3 for applying light to the banknote 80 that is being carried on the transparent plate 1, the optical system 5 for collecting light reflected from or passing through the banknote 80 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1c that are chamfered in a direction in which the banknote is carried on the transparent plate and each of the end portions 1c having notched portions 1d that are chamfered in the direction in which the banknote is carried, and the transparent plate 1 having positioning portions if formed on a lower surface thereof so that the housing 4 and the transparent plate 1 are positioned with respect to each other and are secured to each other.

As can be seen from the above description, in accordance with this embodiment 9, because the transparent plate has the positioning portions formed on the lower surface thereof so that the housing and the transparent plate are positioned with respect to each other and are secured to each other. As a result, the accuracy of the mounting of the transparent plate to the housing can be improved and the high-speed carrying operation can be surely carried out.

Embodiment 10

Figure 19:
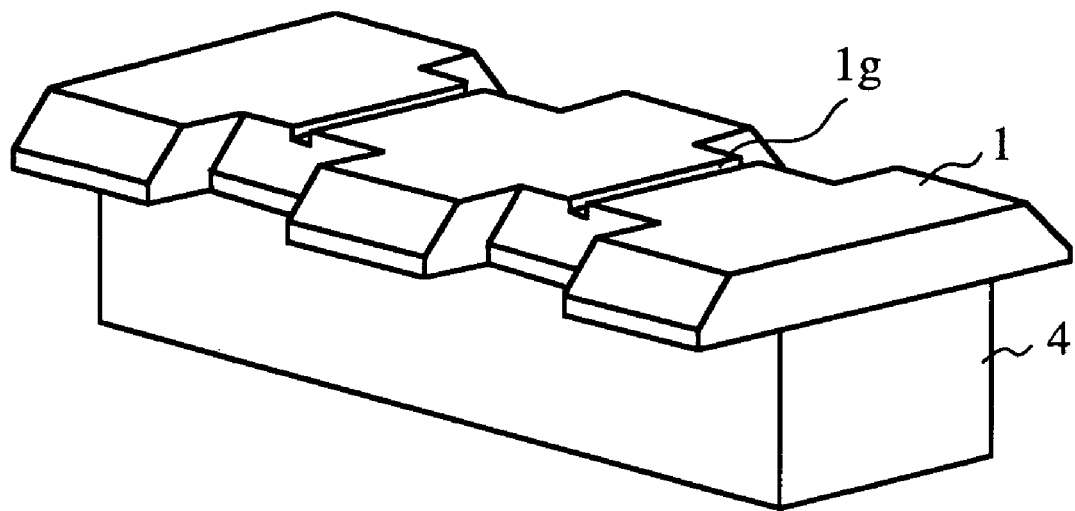
FIG. 19 is a perspective view showing an image reader in accordance with embodiment 10 of the present invention.

FIG. 19 is a perspective view of an image reader in accordance with embodiment 10 of the present invention. The image reader in accordance with embodiment 10 differs from that of embodiment 6 in that grooves 1g are formed in an upper surface of a transparent plate 1 so that they are extending in a direction in which a banknote is carried on the transparent plate.

Next, a description will be made as to an operation of the image reader in accordance with embodiment 10 of the present invention.

The image reader in accordance with embodiment 10 performs an operation of carrying a banknote 80 in the same way that that of embodiment 6 does, and therefore the explanation of the carrying operation will be omitted hereafter. In accordance with embodiment 6, because the space between the transparent plate 1 and a document guide 15 as shown in FIG. 13 is not so wide that something thicker than the banknote 80 cannot be passed through the space, there causes an atmospheric pressure difference in the image reader every time when a banknote 80 is carried at a high speed and this results in a difficulty in the carrying of a banknote 80 whose image is to be captured next. Therefore, the speed of carrying the banknote 80 can be only increased up to such an extent that the carrying of the banknote cannot be affected by the atmospheric pressure difference. In contrast, in accordance with embodiment 10, the atmospheric pressure difference can be reduced by disposing the grooves 1g that are extending in the direction in which the banknote is carried, and therefore the speed of carrying the banknote 80 can be further increased.

In FIG. 19, the two grooves formed in the upper surface of the transparent plate only have to be so arranged that desired information such as a watermark formed on the banknote 80 can be acquired, and the positions, depth, and shape of the two grooves need not be limited. It is needless to say that the two grooves only have to be able to reduce the atmospheric pressure difference caused by the carrying of the banknote 80.

As mentioned above, the image reader in accordance with this embodiment 10 is provided with the light source 3 for applying light to the banknote 80 that is being carried on the transparent plate 1, the optical system 5 for collecting light reflected from or passing through the banknote 80 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1c that are chamfered in a direction in which the banknote is carried on the transparent plate and each of the end portions 1c having notched portions 1d that are chamfered in the direction in which the banknote is carried, and grooves 1g being formed in an upper surface of the transparent plate 1 so that they are extending in the direction in which a banknote is carried.

As can be seen from the above description, in accordance with this embodiment 10, because the grooves are formed in the upper surface of the transparent plate so that they are extending in the direction in which a banknote is carried, the atmospheric pressure difference caused in the image reader can be reduced, and therefore the carrying speed can be increased.

Embodiment 11

Figure 20:
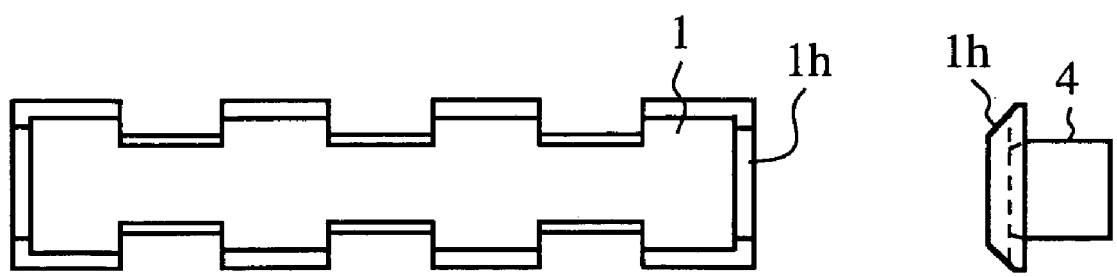
FIG. 20 is a top plan view showing an image reader in accordance with embodiment 11 of the present invention.

FIG. 20 is a top plan view of an image reader in accordance with embodiment 11 of the present invention. The image reader in accordance with embodiment 11 differs from that of embodiment 6 in that a transparent plate 1 has projecting portions 1h formed, as guides, on end portions of an upper surface thereof and extending in a direction in which a banknote is carried.

Next, a description will be made as to an operation of the image reader in accordance with embodiment 11 of the present invention.

The image reader in accordance with embodiment 11 performs an operation of carrying a banknote 80 in the same way that that of embodiment 6 does, and therefore the explanation of the carrying operation will be omitted hereafter. In accordance with embodiment 6, when the banknote 80 is carried at a high speed, the banknote 80 may shift from a desired position when traveling between the transparent plate 1 and a document guide 15 and is then carried in a slanting direction, and this results in a reading trouble. In order to solve this problem, in accordance with embodiment 11, the guide portions are formed on end portions of the upper surface of the transparent plate 1 so that the shorter sides of the banknote 80 can be passed through a gap between the guide portions, thereby preventing the banknote 80 from being carried in a slanting direction.

As mentioned above, the image reader in accordance with this embodiment 11 is provided with the light source 3 for applying light to the banknote 80 that is being carried on the transparent plate 1, the optical system 5 for collecting light reflected from or passing through the banknote 80 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1c that are chamfered in a direction in which the banknote is carried on the transparent plate and each of the end portions 1c having notched portions 1d that are chamfered in the direction in which the banknote is carried, and the transparent plate 1 having projecting portions 1h formed, as guide portions, on end portions of an upper surface thereof and extending in the direction in which the banknote is carried.

As can be seen from the above description, in accordance with this embodiment 11, because the transparent plate has the projecting portions formed, as guide portions, on end portions of the upper surface thereof and extending in the direction in which the banknote is carried, the banknote can be prevented from carried in a slanting direction on the transparent plate.

Embodiment 12

Figure 21:
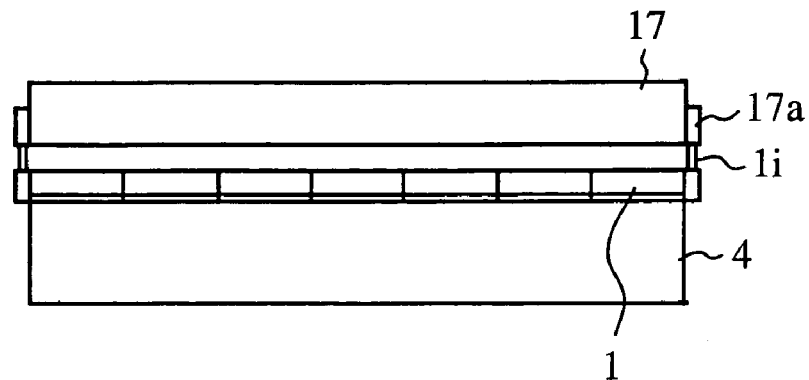
FIG. 21 is a side view showing an image reader in accordance with embodiment 12 of the present invention.
Figure 22:
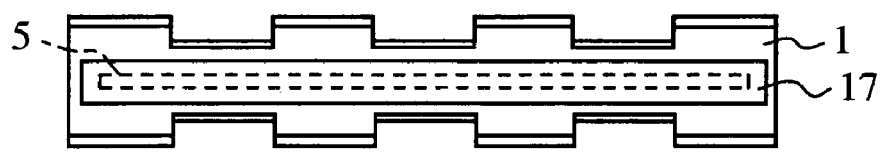
FIG. 22 is a diagram showing a relationship between a relative position of an optical system within an image reader in accordance with embodiment 12 of the present invention with respect to a transmission-type light source, and an output of a photoelectric conversion unit of the image reader.
Figure 22:
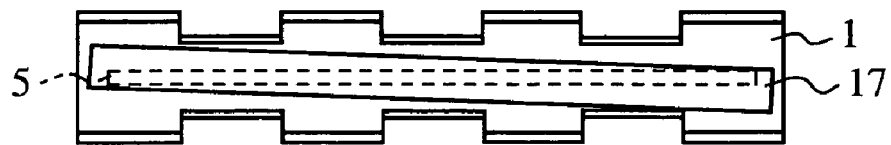
Figure 22:
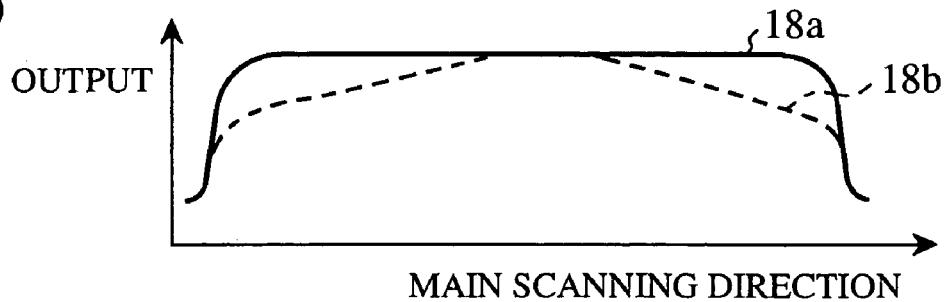

FIG. 21 is a side view of an image reader in accordance with embodiment 12 of the present invention, and FIG. 22 is a diagram showing a relationship between a relative position of an optical system within the image reader in accordance with embodiment 12 of the present invention with respect to a transmission-type light source, and an output profile of a photoelectric conversion unit of the image reader. The image reader in accordance with embodiment 11 differs from that of embodiment 7 in that a projecting portion 1i is formed on a transparent plate 1 and a recess portion 17a is formed in the transmission-type light source 17.

Next, a description will be made as to an operation of the image reader in accordance with embodiment 12 of the present invention.

The image reader in accordance with embodiment 12 performs an operation of carrying a banknote 80 in the same way that that of embodiment 7 does, and therefore the explanation of the carrying operation will be omitted hereafter. FIGS. 22(a) to 22(c) show a relationship between a relative position of an optical system within the image reader in accordance with embodiment 7 of the present invention with respect to a transmission-type light source, and an output profile of a photoelectric conversion unit of the image reader. When the transmission-type light source 17 is located just above an optical system 5 within the image reader, as shown in FIG. 22(a), the photoelectric conversion unit 7 has an output profile as shown by a reference numeral 18a of FIG. 22(c). In contrast, when the transmission-type light source 17 is not located just above the optical system 5 within the image reader, as shown in FIG. 22(b), the photoelectric conversion unit 7 has an output profile as shown by a reference numeral 18b of FIG. 22(c) and the outputs of elements at both ends of the photoelectric conversion unit 7 decrease and therefore the S/N ratio falls. As a result, the reading quality degrades.

Therefore, in accordance with embodiment 7, it is necessary to place the transmission-type light source 17 just above the optical system 5 within the image reader. In contrast, in accordance with embodiment 12, because the projecting portion 1i is formed on the transparent plate 1 and is engaged into the recess portion 17a formed in the transmission-type light source 17, the transmission-type light source 17 can be easily assembled such that it is placed just above the optical system 5 within the image reader.

As mentioned above, the image reader in accordance with this embodiment 12 is provided with the light source 17 for applying light to the banknote 80 that is being carried on the transparent plate 1, the optical system 5 for collecting light passing through the banknote 80 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1c that are chamfered in a direction in which the banknote is carried on the transparent plate and each of the end portions 1c having notched portions 1d that are chamfered in the direction in which the banknote is carried, the optical system 5 collecting light passing through the banknote 80 that is being carried on the transparent plate 1, and the transparent plate 1 having a projecting portion 1i formed thereon and engaged into the light source 17.

As can be seen from the above description, in accordance with this embodiment 12, because the projecting portion formed on the upper surface of the transparent plate and is engaged into the light source, the mounting of the transmission-type light source to the housing is further facilitated.

Embodiment 13

Figure 23:
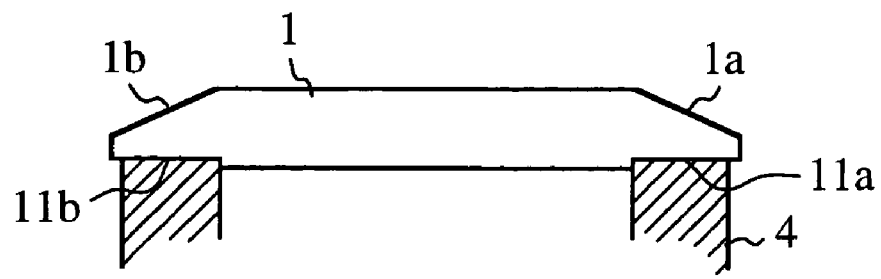
FIG. 23 is a cross-sectional view showing an image reader in accordance with embodiment 13 of the present invention.
Figure 24:
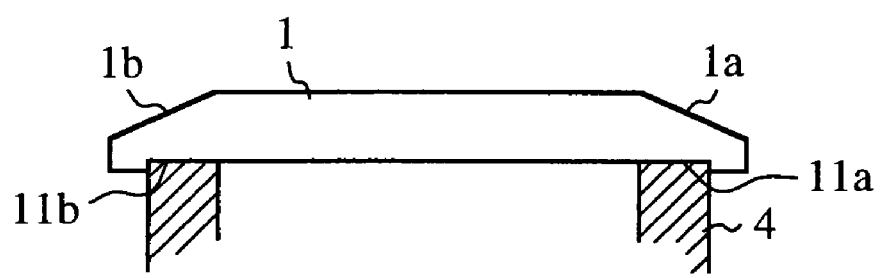
FIG. 24 is a cross-sectional view showing an image reader in accordance with embodiment 13 of the present invention.

FIGS. 23 and 24 are cross-sectional views each showing an image reader in accordance with embodiment 13 of the present invention. The image reader in accordance with embodiment 13 differs from that of embodiment 1 in that recess portions 11a and 11b are formed in a lower surface of a transparent plate 1, and a housing 4 is engaged into the recess portions.

Next, a description will be made as to an operation of the image reader in accordance with embodiment 13 of the present invention.

The image reader in accordance with embodiment 13 performs an operation of carrying a document 8 in the same way that that of embodiment 1 does, and therefore the explanation of the carrying operation will be omitted hereafter. In accordance with embodiment 13, because the recess portions 11a and 11b are formed in the lower surface of the transparent plate 1 in the image reader in accordance with embodiment 1, the image reader can be easily assembled by engaging the housing 4 into the recess portions.

As mentioned above, the image reader in accordance with this embodiment 13 is provided with the light source 3 or 17 for applying light to the document 8 that is being carried on the transparent plate 1, the optical system 5 for collecting light reflected from or passing through the document 8 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1a and 1b that are chamfered in a direction in which the document is carried on the transparent plate, and the transparent plate 1 having recess portions 11a and 11b formed in a lower surface thereof and being engaged with the housing 4.

As can be seen from the above description, in accordance with this embodiment 13, because the recess portions are formed in the lower surface of the transparent plate, and the housing is engaged into the recess portions, the mounting of the transparent plate to the housing is further facilitated.

Embodiment 14

Figure 25:
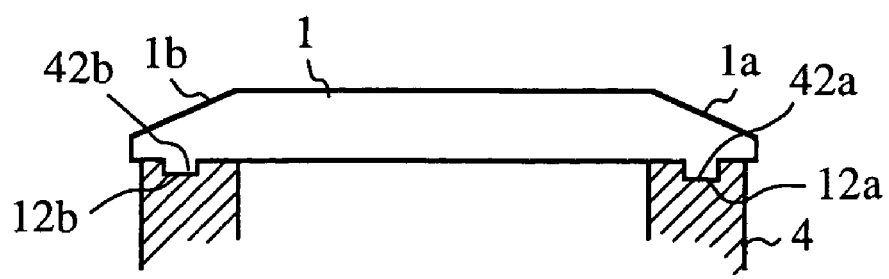
FIG. 25 is a cross-sectional view showing an image reader in accordance with embodiment 14 of the present invention.

FIG. 25 is a cross-sectional view of an image reader in accordance with embodiment 14 of the present invention. The image reader in accordance with embodiment 14 differs from that of embodiment 1 in that projecting portion 12a and 12b are formed in a lower surface of a transparent plate 1, and are engaged into recess portions 42a and 42b of a housing 4.

Next, a description will be made as to an operation of the image reader in accordance with embodiment 14 of the present invention.

The image reader in accordance with embodiment 14 performs an operation of carrying a document 8 in the same way that that of embodiment 1 does, and therefore the explanation of the carrying operation will be omitted hereafter. In accordance with embodiment 14, because the projecting portion 12a and 12b are formed in the lower surface of the transparent plate 1 within the image reader of the embodiment 1, and are engaged into the recess portions 42a and 42b of the housing 4, the image reader can be easily assembled by engaging the transparent plate 1 into the housing 4.

It is needless to say that the concept in accordance with embodiment 14 that the projecting portion 12a and 12b are formed in the lower surface of the transparent plate 1 and are engaged into the recess portions 42a and 42b of the housing 4 can be applied to any other embodiment mentioned above, as well as to the image reader in accordance with embodiment 1. In this case, the same advantage is provided. Furthermore, because there is no space between the transparent plate 1 and the housing 4, small cuttings of such a document as a check and banknote are prevented from easily entering the housing 4 more effectively.

Figure 26:
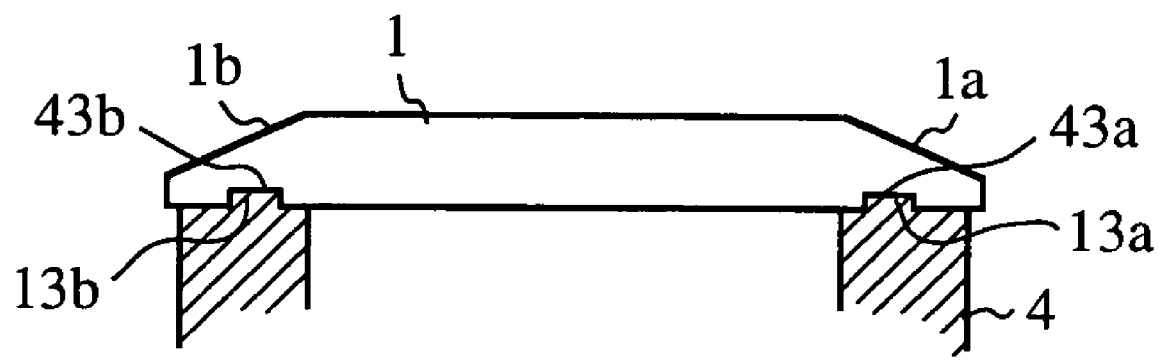
FIG. 26 is a cross-sectional view showing an image reader in accordance with embodiment 14 of the present invention.

FIG. 26 is a cross-sectional view of another example of the image reader in accordance with embodiment 14 of the present invention. The image reader of FIG. 26 differs from that of FIG. 25 in that instead of forming the projecting portions in the lower surface of the transparent plate 1 and making them be engaged into the recess portions of the housing 4, recess portions 13a and 13b are formed in the lower surface of the transparent plate 1 and are engaged with projecting portions 43a and 43b formed on the housing 4. The structure shown in FIG. 26 offers the same advantage as provided by the structure shown in FIG. 25.

As mentioned above, the image reader in accordance with this embodiment 14 is provided with a light source 3 or 17 for applying light to a document 80 that is carried on a transparent plate 1, an optical system 5 for collecting light reflected from or passing through the document 8 so as to generate optical information, a photoelectric conversion unit 7 for converting the optical information output from the optical system into an electrical signal, an a housing 4 for housing at least the transparent plate 1, the optical system 5, and the photoelectric conversion unit 7, the transparent plate 1 having end portions 1a and 1b that are chamfered in a direction in which the document is carried on the transparent plate, and the transparent plate 1 having projecting portions 12a and 12b formed on a lower surface thereof and being engaged into holes of the housing 4.

As can be seen from the above description, in accordance with this embodiment 14, because the projecting portions are formed on the lower surface of the transparent plate and are engaged into the recess portions of the housing, the mounting of the transparent plate to the housing is further facilitated.

Embodiment 15

Figure 27:
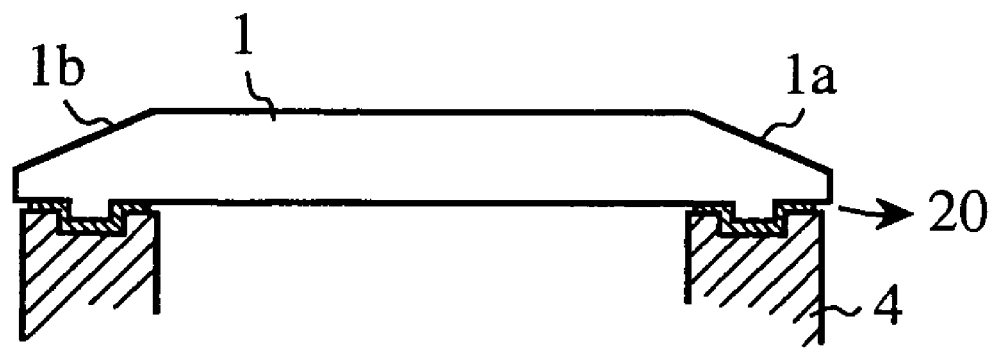
FIG. 27 is a cross-sectional view showing an image reader in accordance with embodiment 15 of the present invention.

FIG. 27 is a cross-sectional view of an image reader in accordance with embodiment 15 of the present invention. The image reader in accordance with embodiment 15 differs from that of embodiment 14 in that projecting portions are formed on a lower surface of a transparent plate 1 and recess portions are formed in an upper face of a housing 4, and a binding material 20 is filled into a gap between each of projecting portions and a corresponding recess portion so that the transparent plate is engaged into the housing.

Next, a description will be made as to an operation of the image reader in accordance with embodiment 15 of the present invention.

The image reader in accordance with embodiment 15 performs an operation of carrying a document 8 in the same way that that of embodiment 14 does, and therefore the explanation of the carrying operation will be omitted hereafter. In accordance with embodiment 15, the projecting portions are formed on the lower surface of the transparent plate 1 and are engaged into the housing 4, and the binding material 20 is filled into a gap between each of the projecting portions and a corresponding recess portion of the housing so that there is no space between the transparent plate 1 and the housing 4 and the transparent plate is secured to the housing. As a result, there is no space between the transparent plate 1 and the housing 4 and therefore small cuttings of such a document as a check or banknote can be prevented from entering the housing.

It is needless to say that the concept in accordance with embodiment 15 that the projecting portions are formed on the lower surface of the transparent plate 1 and are engaged into the housing 4, and a binding material is filled into a gap between each of the projecting portions and a corresponding recess portion of the housing so that there is no space between the transparent plate 1 and the housing 4 and the transparent plate is secured to the housing can be applied to any other embodiment mentioned above, as well as to the image reader in accordance with embodiment 14, and this variant provides the same advantage.

As mentioned above, the image reader in accordance with this embodiment 15 is provided with the light source 3 or 17 for applying light to the document 8 that is being carried on the transparent plate 1, the optical system 5 for collecting light reflected from or passing through the document 8 so as to generate optical information, the photoelectric conversion unit 7 for converting the optical information output from the optical system into an electrical signal, and the housing 4 for housing at least the transparent plate 1, the optical system 5, and the photoelectric conversion unit 7, the transparent plate 1 having end portions 1a and 1b that are chamfered in a direction in which the document is carried on the transparent plate, the transparent plate 1 having projecting portions 12a and 12b formed on a lower surface thereof and being engaged into the housing 4, and a binding material 20 being filled into a contact portion between the transparent plate and the housing.

As can be seen from the above description, in accordance with this embodiment 15, because the contact portion between the transparent plate and the housing is filled with the binding material, there is no space between the transparent plate and the housing and therefore small cuttings of such a document as a check or banknote can be prevented from entering the housing.

INDUSTRIAL APPLICABILITY

As mentioned above, the image reader in accordance with the present invention is suitable for high-speed reading of a check or banknote, for high-speed reading using bidirectional carrying of documents, for high-speed reading of both sides of a document using light reflected from the document and light passing through the document, and for high-speed reading while preventing motes from entering a housing of the image reader via space between a transparent plate and the housing.

The invention claimed is:

1. An image reader comprising:
   a light source for applying light to a document that is being carried on a transparent plate;
   an optical system for collecting light reflected from or passing through said document so as to generate optical information;
   a photoelectric conversion unit for converting the optical information output from said optical system into an electrical signal; and a housing for housing at least said transparent plate, said optical system, and said photoelectric conversion unit, said transparent plate having end portions that are chamfered in a direction in which the document is carried on said transparent plate, wherein each of said chamfered end portions of said transparent plate have notched portions that are chamfered in the direction in which the document is carried on said transparent plate, and said housing includes a holder that has projecting portions that engage with said chamfered end portions of the transparent plate.

2. The image reader according to claim 1, wherein said transparent plate is engaged into recess portions formed in said housing.

3. The image reader according to claim 2, wherein said housing has end portions that are chamfered in the direction in which the document is carried on said transparent plate.

4. The image reader according to claim 2, wherein said housing has end portions that are chamfered and face the end portions of said transparent plate that are chamfered in the direction in which the document is carried on said transparent plate, respectively.

5. The image reader according to claim 3, wherein each of said chamfered end portions of said housing has a chamfered part facing a corresponding one of the end portions of said transparent plate that are chamfered in the direction in which the document is carried on said transparent plate.

6. The image reader according to claim 5, wherein each of said chamfered end portions of said transparent plate has an angle ranging from 10 degrees to 40 degrees with respect to the direction in which the document is carried on said transparent plate.

7. The image reader according to claim 1, wherein said optical system collects light passing through the document being carried on said transparent plate.

8. The image reader according to claim 1, wherein each of said notched portions doesn't extend to a lower surface of said transparent plate.

9. The image reader according to claim 7, wherein each of said notched portions doesn't extend to a lower surface of said transparent plate.

10. The image reader according to claim 1, wherein said transparent plate has positioning portions formed on a lower surface thereof and said housing is secured to said transparent plate through said positioning portions of said transparent plate.

11. The image reader according to claim 1, wherein said transparent plate has a groove that is formed in an upper surface thereof and is extending in the direction in which the document is carried thereon.

12. The image reader according to claim 7, wherein said transparent plate has a groove that is formed in an upper surface thereof and is extending in the direction in which the document is carried thereon.

13. The image reader according to claim 1, wherein said transparent plate has projecting portions that are formed on an upper surface thereof, are extending in the direction in which the document is carried on said transparent plate, and serve as guides for the document.

14. The image reader according to claim 7, wherein said transparent plate has projecting portions that are formed on an upper surface thereof, are extending in the direction in which the document is carried on said transparent plate, and serve as guides for the document.

15. The image reader according to claim 7, wherein said transparent plate has a projecting portion formed on an upper surface thereof, and said projecting portion of said transparent plate is engaged into said light source.

16. The image reader according to claim 1, wherein said transparent plate has recess portions formed in a lower surface thereof, and said housing is engaged into said recess portions of said transparent plate.

17. The image reader according to claim 1, wherein said transparent plate has projecting portions formed on a lower surface thereof, and said projecting portions of said transparent plate are engaged into said housing.

18. The image reader according to claim 17, wherein a binding material is filled into a contact portion between said transparent plate and said housing.

19. The image reader according to claim 1, wherein the projecting portions of the holder have chamfered end portions so as to engage with the chamfered end portions.

* * * * *